US009795869B2

(12) United States Patent
Brazier

(10) Patent No.: US 9,795,869 B2
(45) Date of Patent: Oct. 24, 2017

(54) GEOMETRICAL SHAPE APPARATUS

(71) Applicant: HEXCEL DESIGNS LIMITED, Eastleigh, Hampshire (GB)

(72) Inventor: Stephen William Cruwys Brazier, Eastleigh (GB)

(73) Assignee: HEXCEL DESIGNS LIMITED, Eastleigh (GB)

( * ) Notice: Subject to any disclaimer, the term of this patent is extended or adjusted under 35 U.S.C. 154(b) by 0 days.

(21) Appl. No.: 14/995,086

(22) Filed: Jan. 13, 2016

(65) Prior Publication Data

US 2016/0199727 A1     Jul. 14, 2016

Related U.S. Application Data

(63) Continuation of application No. 13/997,249, filed as application No. PCT/GB2011/052574 on Dec. 22, 2011, now abandoned.

(30) Foreign Application Priority Data

Dec. 24, 2010    (GB) .................................. 1021988.9

(51) Int. Cl.

| A63F 1/00 | (2006.01) |
|---|---|
| A63F 9/06 | (2006.01) |
| A63F 11/00 | (2006.01) |
| G09B 7/00 | (2006.01) |
| G09B 19/02 | (2006.01) |
| A63F 9/10 | (2006.01) |
| G09B 19/00 | (2006.01) |

(52) U.S. Cl.
CPC .......... *A63F 9/0612* (2013.01); *A63F 9/0669* (2013.01); *A63F 9/10* (2013.01); *A63F 11/00* (2013.01); *G09B 7/00* (2013.01); *G09B 19/00* (2013.01); *G09B 19/025* (2013.01); *A63F 2009/068* (2013.01); *A63F 2009/0695* (2013.01); *A63F 2009/0697* (2013.01)

(58) Field of Classification Search
CPC ......................................................... A63F 1/00
USPC .......................................................... 273/292
See application file for complete search history.

(56) References Cited

U.S. PATENT DOCUMENTS

| 3,637,217 A | * | 1/1972 | Kent .......................... 273/157 R |
|---|---|---|---|
| 3,891,217 A | * | 6/1975 | Geary et al. ................ 273/282.3 |
| 4,249,742 A | * | 2/1981 | Vergara et al. ................ 273/294 |
| 4,773,649 A | * | 9/1988 | Cheng ........................ 273/157 R |

(Continued)

FOREIGN PATENT DOCUMENTS

| DE | 9413866 U1 | 11/1994 |
|---|---|---|
| JP | H1-285285 A | 11/1989 |
| WO | 2012085592 A1 | 6/2012 |

OTHER PUBLICATIONS

Information Disclosure Statement (IDS) Letter Regarding Common Patent Appplication(s), dated May 20, 2016.

(Continued)

*Primary Examiner* — Aarti B Berdichevsky
*Assistant Examiner* — Dolores Collins
(74) *Attorney, Agent, or Firm* — Tillman Wright, PLLC; James D. Wright; David R. Higgins

(57) ABSTRACT

Apparatus comprising a set of shapes, the shapes derived from a hexagonal footprint, and wherein for each of the shapes, at least some of the vertices of the hexagon joined with straight lines to define a perimeter of a respective shape of the set.

22 Claims, 17 Drawing Sheets

(56) References Cited

U.S. PATENT DOCUMENTS

| | | | |
|---|---|---|---|
| 4,874,936 A * | 10/1989 | Chandler et al. | 235/494 |
| 4,896,029 A * | 1/1990 | Chandler et al. | 235/494 |
| 4,955,615 A * | 9/1990 | Eck | 273/241 |
| 4,957,291 A * | 9/1990 | Miffitt et al. | 463/9 |
| 5,104,125 A * | 4/1992 | Wilson | 273/157 R |
| 5,111,534 A * | 5/1992 | Benner | 455/447 |
| 5,173,003 A * | 12/1992 | Hair | 404/41 |
| 5,301,953 A * | 4/1994 | Levin | 273/276 |
| 5,524,897 A | 6/1996 | Mastronunzio | |
| 5,591,956 A * | 1/1997 | Longacre et al. | 235/462.1 |
| 5,639,090 A * | 6/1997 | Stevens | 273/287 |
| 5,742,086 A * | 4/1998 | Rostoker et al. | 257/300 |
| 5,872,380 A * | 2/1999 | Rostoker et al. | 257/369 |
| 6,167,036 A * | 12/2000 | Beven | 370/331 |
| 6,407,434 B1 * | 6/2002 | Rostoker et al. | 257/401 |
| 6,766,623 B1 * | 7/2004 | Kalnay | 52/641 |
| D587,321 S * | 2/2009 | Patel | D21/391 |
| 7,906,734 B2 * | 3/2011 | Del Rosario et al. | 174/262 |
| 8,208,679 B2 | 6/2012 | Opitz | |
| 8,308,537 B2 * | 11/2012 | Sherin et al. | 463/9 |
| 8,375,841 B2 * | 2/2013 | Bocini et al. | 89/36.02 |
| 8,404,965 B2 * | 3/2013 | Dame | |
| 8,542,492 B2 | 9/2013 | Dunn, Jr. | |
| 8,616,948 B2 * | 12/2013 | Sherin et al. | 463/9 |
| 8,684,020 B1 * | 4/2014 | Shires | 135/87 |
| 8,840,349 B2 * | 9/2014 | Mevius et al. | 411/410 |
| 2008/0116637 A1 | 5/2008 | Seals | |
| 2010/0023929 A1 * | 1/2010 | Jones et al. | 717/124 |
| 2010/0289215 A1 * | 11/2010 | Tan et al. | 273/156 |
| 2012/0183724 A1 * | 7/2012 | Ros et al. | 428/118 |
| 2013/0295548 A1 | 11/2013 | Brazier | |
| 2014/0205807 A1 | 7/2014 | Lacas et al. | |

OTHER PUBLICATIONS

"Dividing Regular Hexagon Equally, at Random," uploaded on Jan. 29, 2012, retrieved on Mar. 7, 2016, accessible at http://blogs.yahoo.co.jp/crazy_tombo/46000812.html (5 pages).

"International Search Report of the International Search Authority" (European Patent Office) in Hexcel Designs Limited, International Patent Application Serial No. PCT/GB2011/052574, dated Mar. 23, 2012 (4 pages).

* cited by examiner

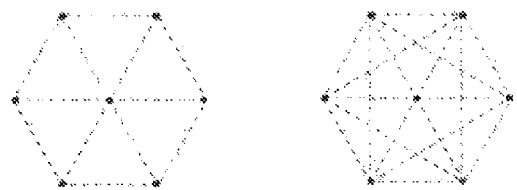
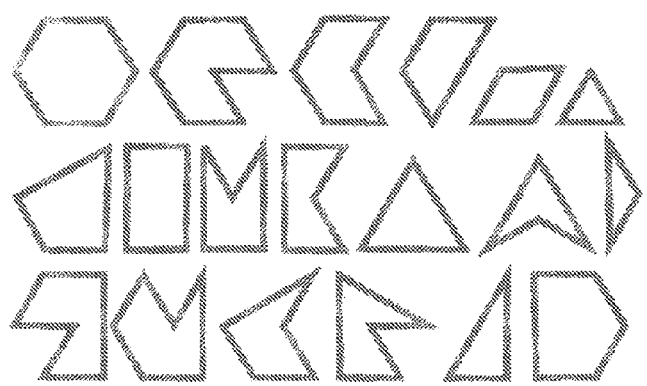
fig.1
fig.2
fig.3
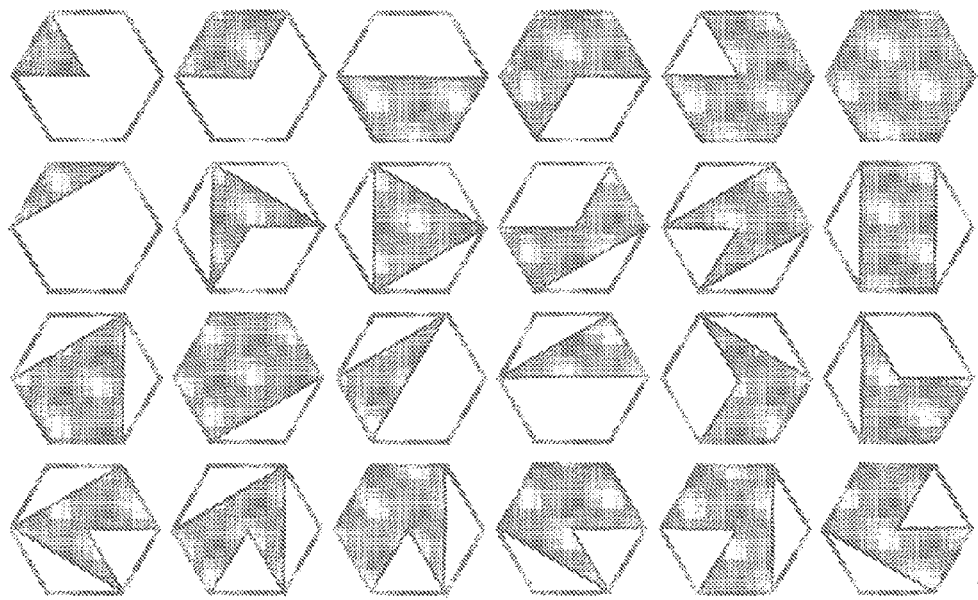
fig.4

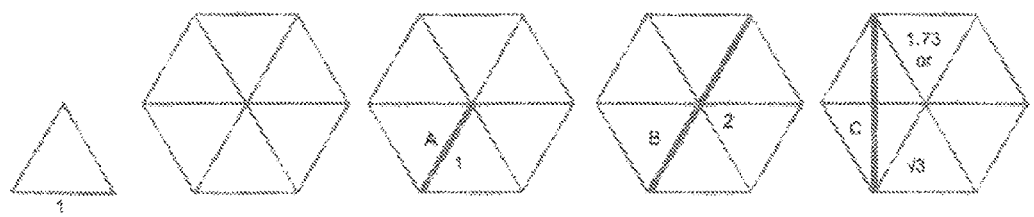
fig.5
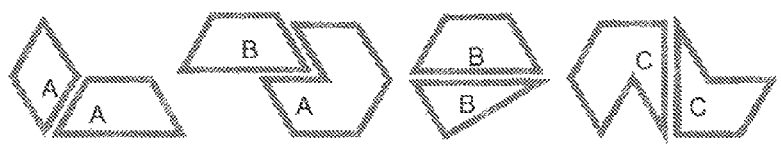
A-A    A-B    B-B    C-C    fig.6
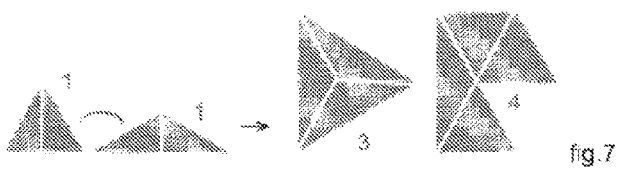
fig.7
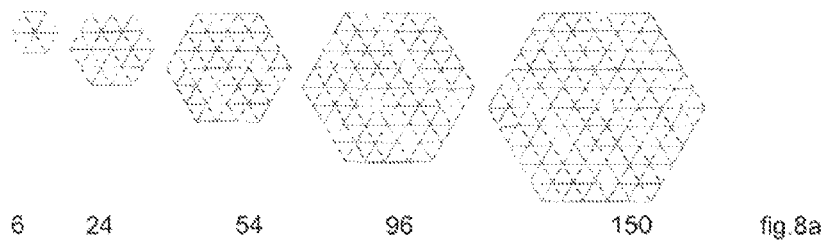
6    24    54    96    150    fig.8a
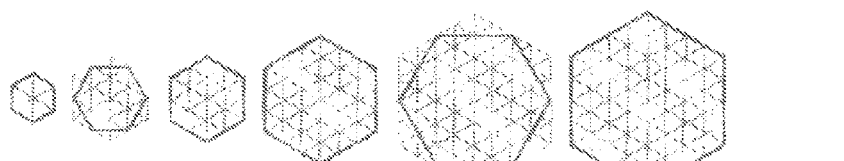
6    18    24    54    72    96    fig.8b
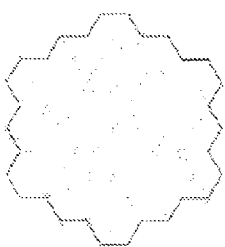 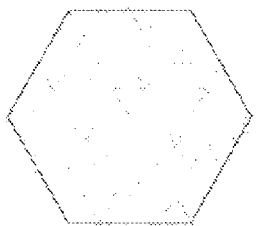 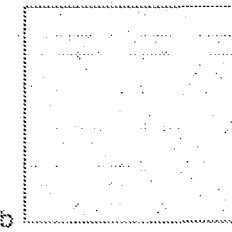
fig. 9a    fig. 9b    fig. 9c

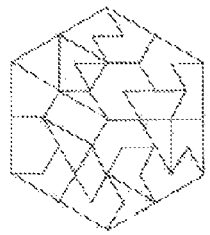 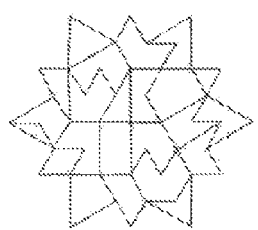 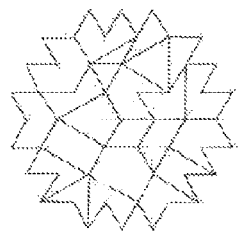 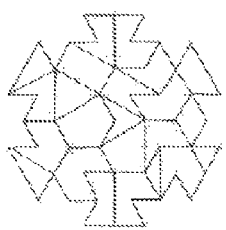
Fig.10a PS1  Fig.10b PS2  Fig.10c PS3  Fig.10d PS4
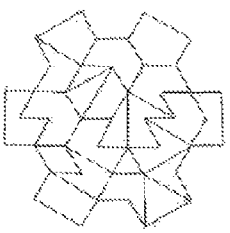 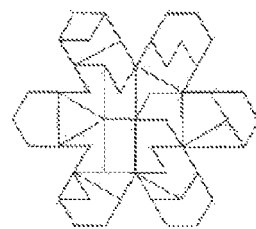 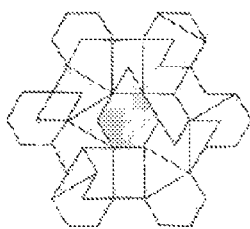 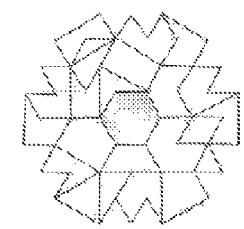
Fig.10e PS5  Fig.10f PS6  Fig.10g PS7  Fig.10h PS8
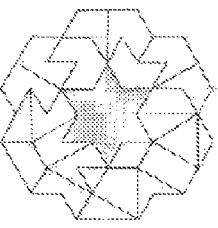 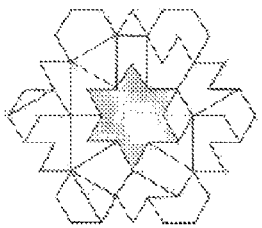 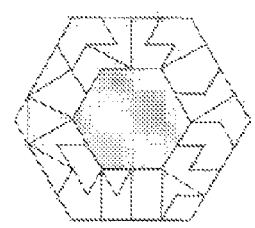 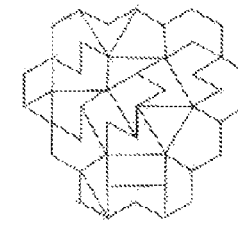
Fig.10i PS9  Fig.10j PS10  Fig. 10k PS11  Fig. 10l PS12
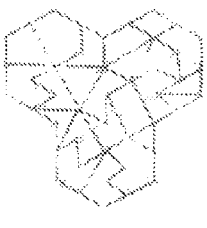 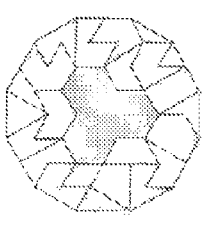 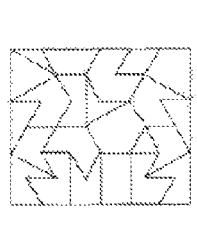 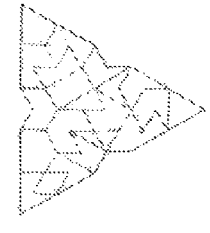 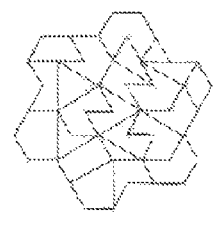
Fig. 10m PS13  Fig. 10n PS14  Fig. 10o PS15  Fig. 10p PS16  Fig. 10q PS17
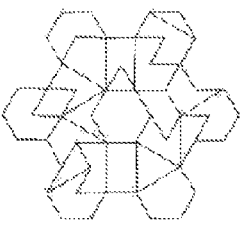 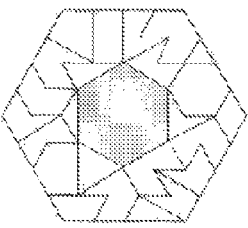 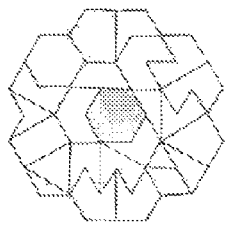 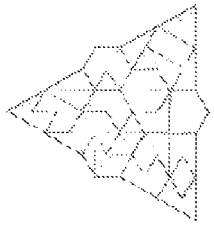
Fig.11a PS18  Fig.11b PS19  Fig.11c PS20  Fig.11d PS21

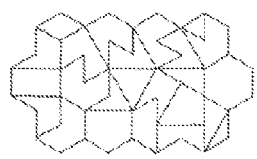
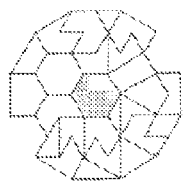
Fig. 11e PS22   Fig. 11f PS23
6   6   2   6   fig. 12
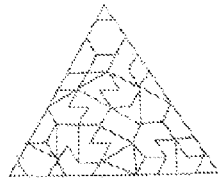
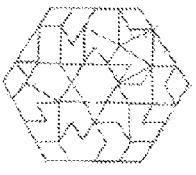
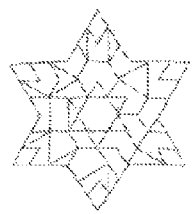
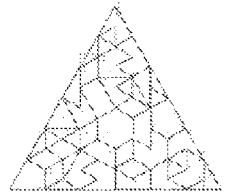
Fig 13a  
A = 100 - PS24  
Equilateral triangle
Fig 13b  
A= 96 - PS25  
Hexagon
Fig 13c  
A= 108 - PS26  
Hexagram
Fig 13d  
A = 108 - PS27  
'Big' triangle
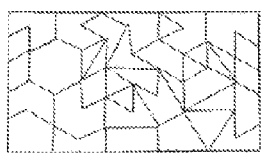
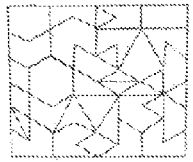
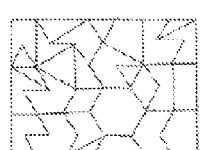
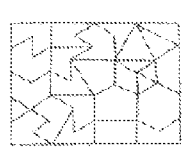
Fig 13e  
A= 100 - PS28  
Rectangle '10'x5
Fig 13f  
A= 96 - PS29  
Rectangle '8'x6
Fig 13g  
A= 84 - PS30  
Rectangle 7x'6'
Fig 13h  
A= 80 - PS31  
Rectangle '8'x5
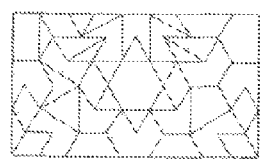
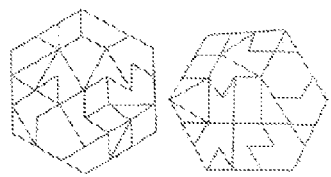
Fig 13i  
A=108  
PS32 Rectangle 9x'6'
Fig 13j  
A= 108  
PS33 'Joined' Hexagons
Fig 13k  
A=54x2  
PS34 Two Hexagons

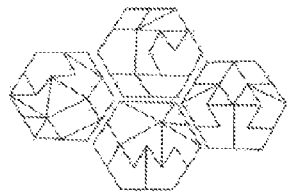
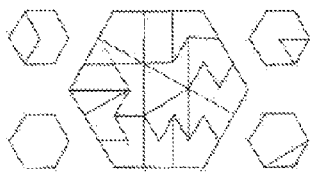
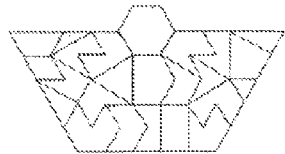
Fig 13l
A= 24x4 - PS35 Hexagons
Fig 13m
A= 78 - PS36 Multi-Hex
Fig 13n
A= 78 - PS37 Trapezium Hex
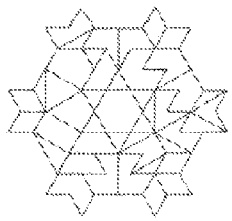
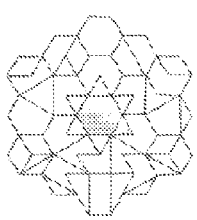
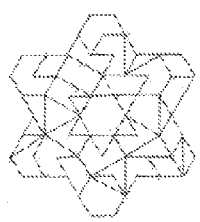
Fig 13o
A= 108 - PS38 'Spiky' Hex
Fig 13p
A= 108 - PS39 'Setup' Hex
Fig 13q
A= 102 - PS40 'Thick' hexagram
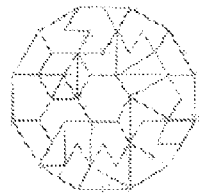
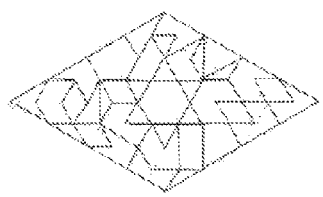
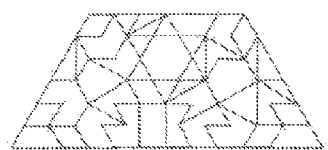
Fig 13r
A = 90 - PS41 'Ball'
Fig 13s
A = 96 - PS42 Rhombus
Fig 13t
A = 108 - PS43 Trapezium
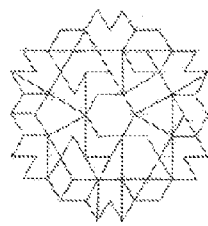
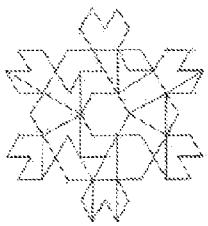
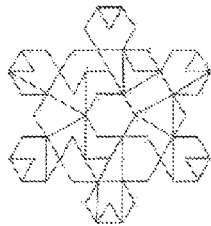
Fig 13u
PS44 'Flower' - A = 108
Fig 13v
A = 84 - PS45 'Claw'
Fig 13w
A = 90 - PS46 'Snowdrop'
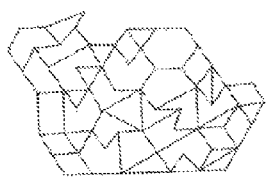
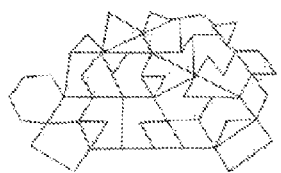
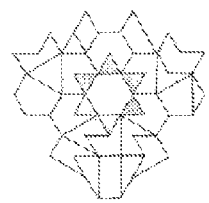
Cat
Tortoise
Mask           fig.14

Task
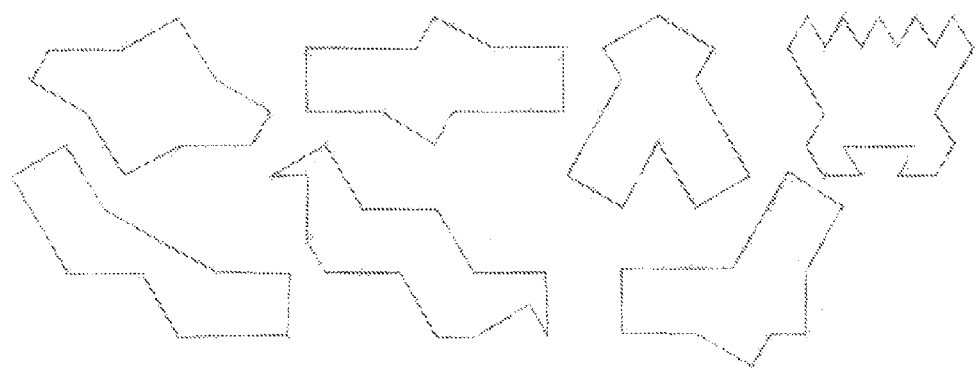
A solution
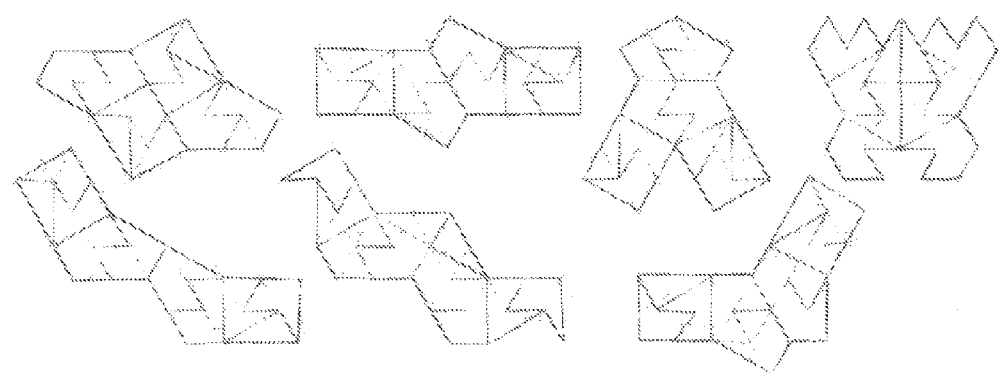
fig.15
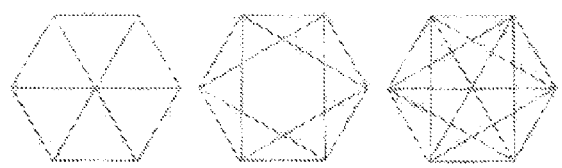
fig.16a
fig.16b
Container B:
| | 6 | 6 | 2 | 6 |
fig.17

Winning hands
Hex Run
1. Same color
2. Both colors
Rectangle Morph
1. Same color
2. Both colors
Triangle Morph
1. Same color
2. Both colors
Reflective Pair
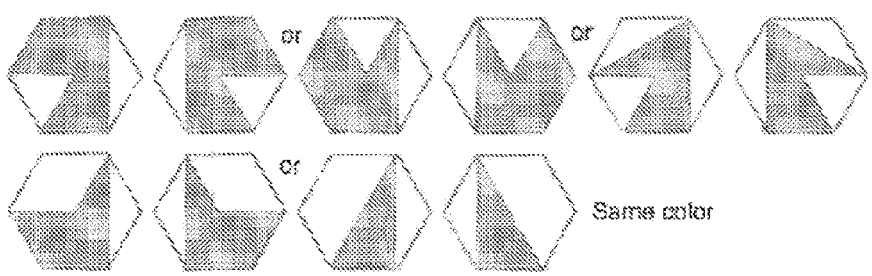
Same color
Identical Pair
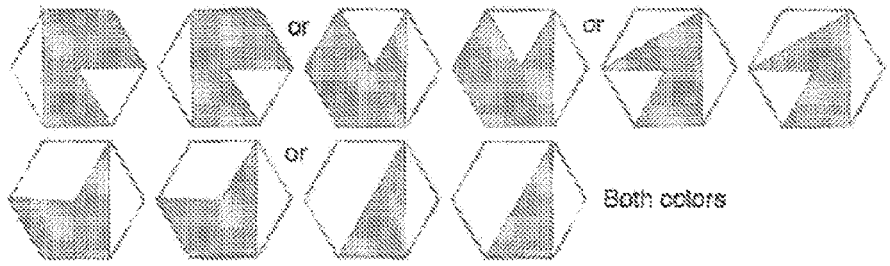
Both colors
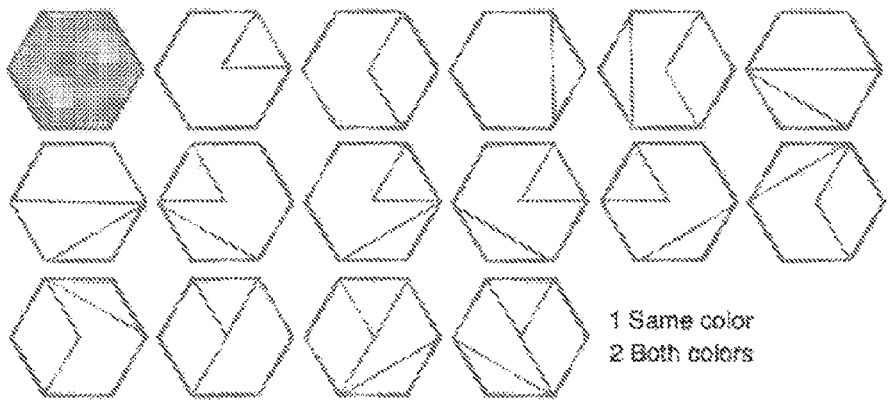
1. Same color
2. Both colors
fig.26

Hierarchy of Shapes.

Card

Required throw

Figure 31
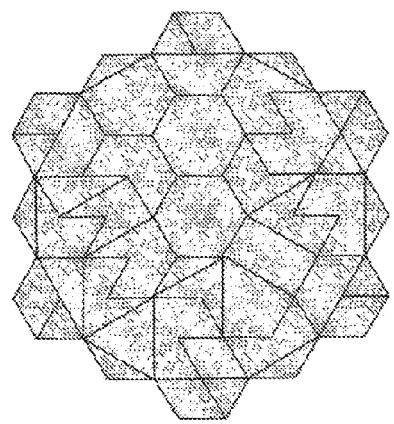
Fig 31c
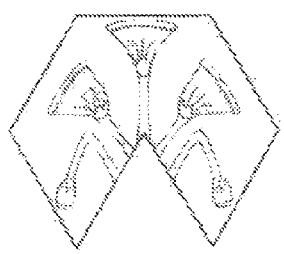
Fig 31b
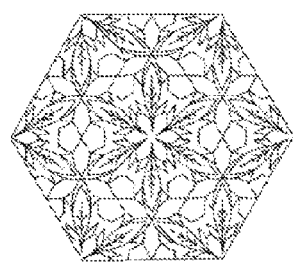
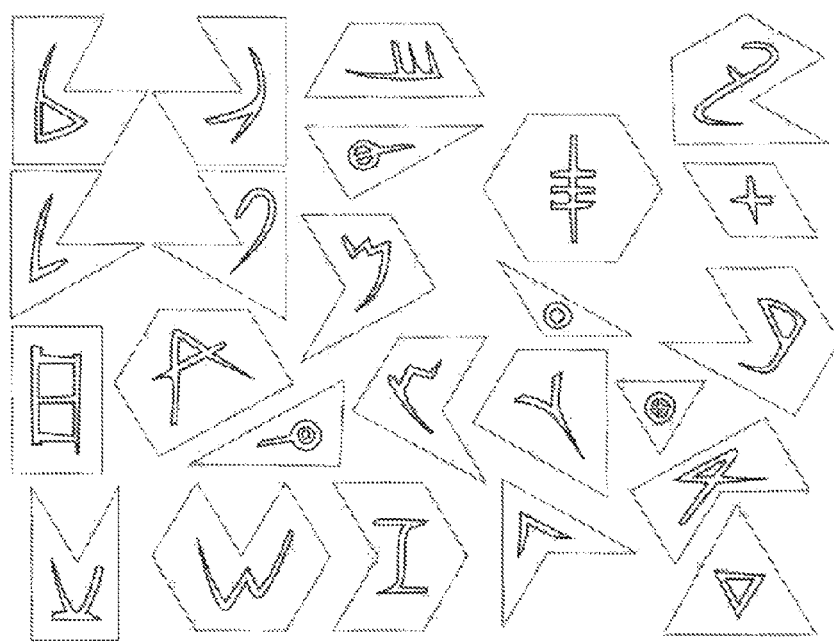
Fig 31d
Fig 31a Figure 32
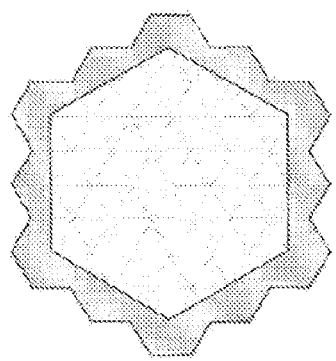
PS1 Fig. 32a
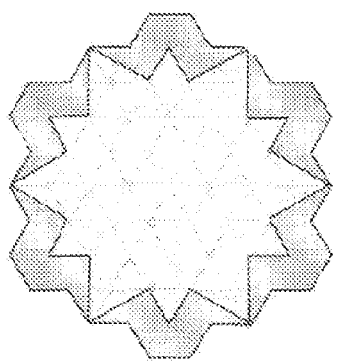
PS2 Fig. 32b
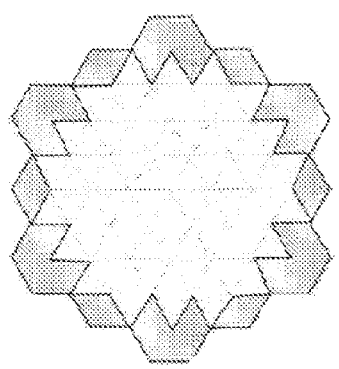
PS3 Fig. 32c
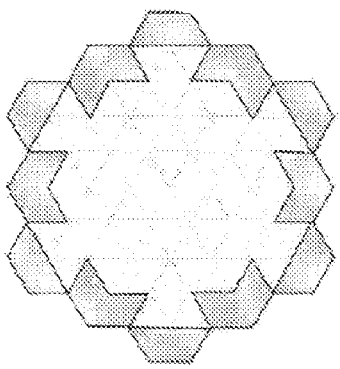
PS4 Fig. 32d
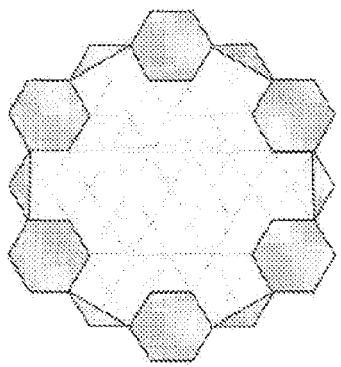
PS5 Fig. 32e
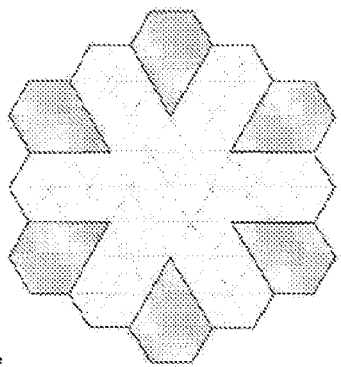
PS6 Fig. 32f
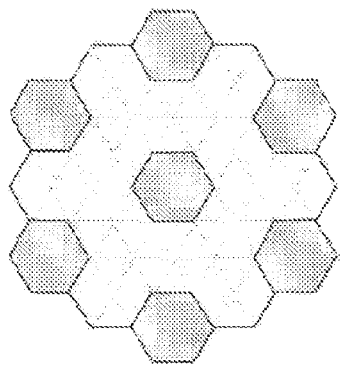
PS7 Fig. 32g
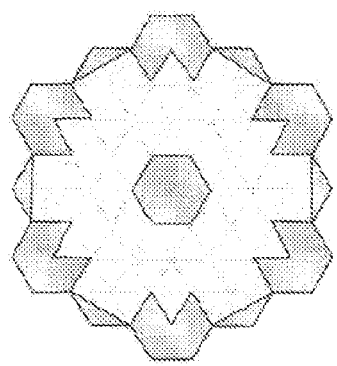
PS8 Fig. 32h

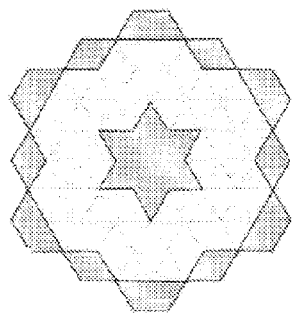
PS9 Fig. 32i
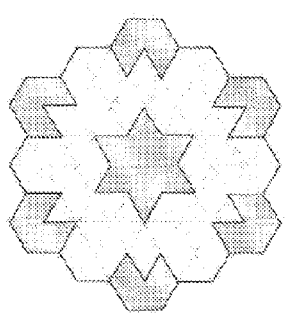
PS10 Fig. 32j
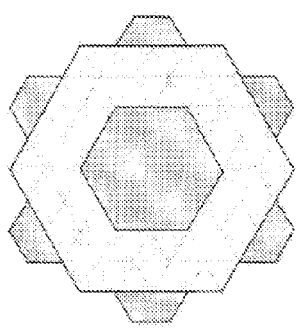
PS11 Fig. 32k
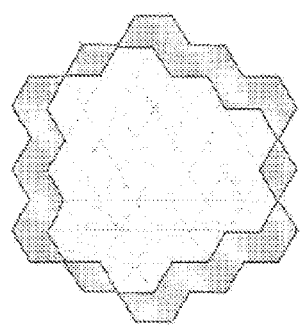
PS12 Fig. 32l
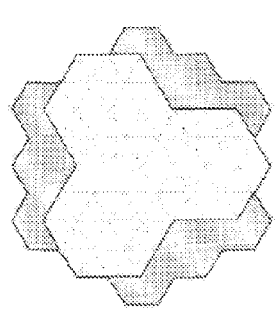
PS13 Fig. 32m
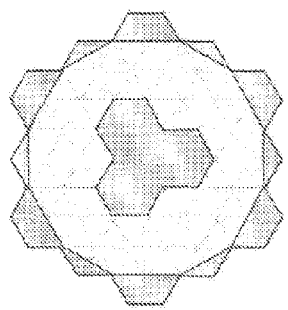
PS14 Fig. 32n
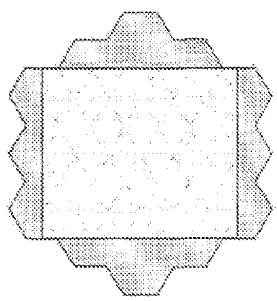
PS15 Fig. 32o
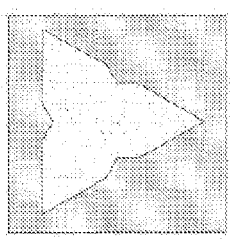
PS16 Fig 32p
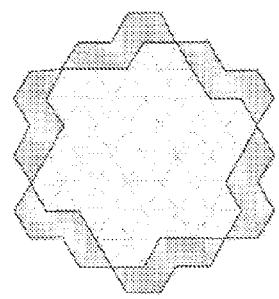
PS17 Fig. 32q

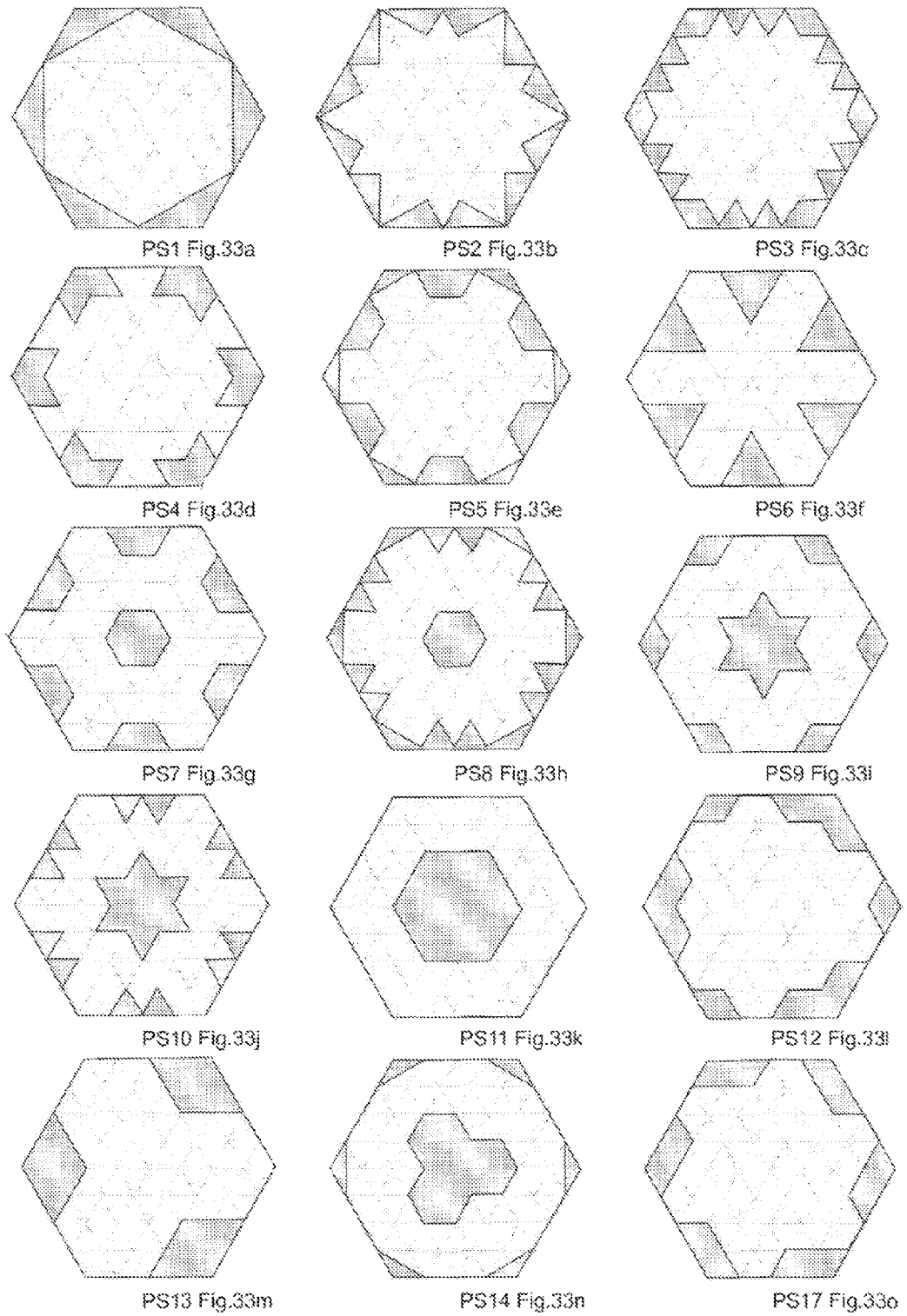

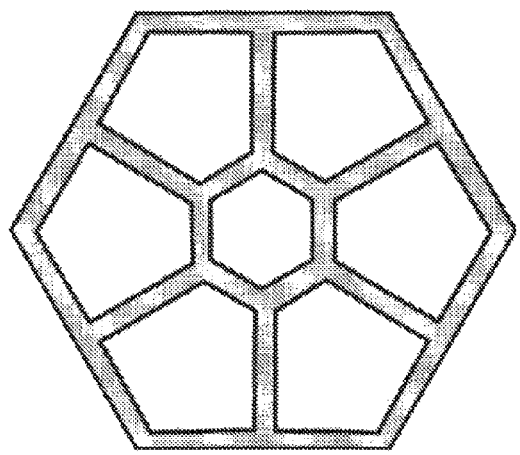
Fig.34a
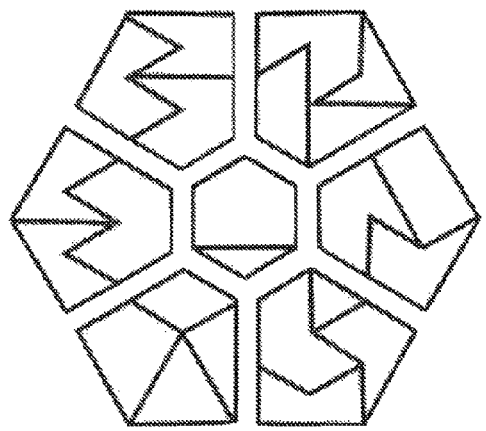
Fig.34b  PS47
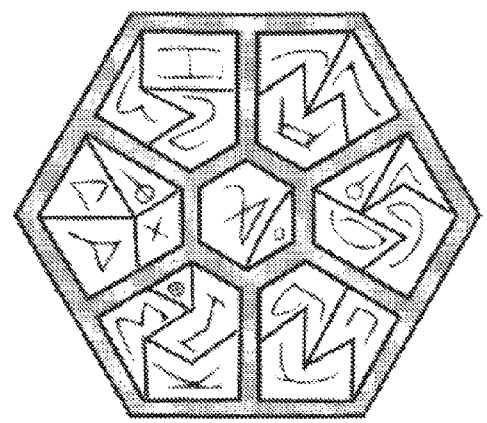
Fig.34c
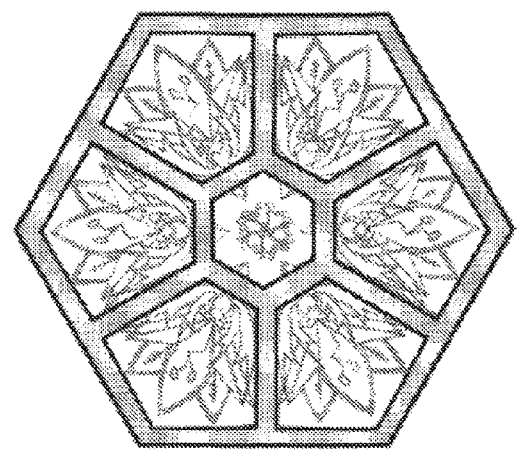
Fig.34d

GEOMETRICAL SHAPE APPARATUS

CROSS REFERENCE TO RELATED APPLICATIONS

This application is a U.S. continuation patent application of, and claims priority under 35U.S.C. §120 to, U.S. patent application Ser. No. 13/997,249, filed Jun. 22, 2013, which '249 application published as U.S. patent application publication no. US 2013/0295548 A1 on Nov. 7, 2013, and which '249 application is the U.S. national stage application under 35U.S.C. §371 of International Application No. PCT/GB2011/052574, filed Dec. 22, 2011and designating the U.S., which published as WO 2012/085592 A1 on Jun. 28, 2012, and which claims the benefit of United Kingdom Patent Application No. GB 1021988.9, filed Dec. 24, 2010. Each of the foregoing patent applications and patent application publications is expressly incorporated by reference herein in its entirety.

TECHNICAL FIELD

The present invention relates generally to geometrical shape apparatus.

BACKGROUND

We have realised that geometrical shape apparatus which includes a set of shapes derived from a hexagonal footprint can advantageously provide numerous applications and activities.

SUMMARY

According to a first aspect of the invention there is provided apparatus comprising a set of shapes, the shapes derived from a hexagonal footprint, and for each of the shapes, at least some of the vertices of the hexagon, preferably including the centre point, joined with straight lines to define a perimeter of a respective shape of the set.

Various embodiments of the invention seek to provide a comprehensive and versatile system in which the combination of two-dimensional, inter-related, geometrical shapes give rise to a variety of activities and applications including puzzles; pattern making apparatus; physical games—board games, playing card games, and dice games; digital applications; educational resources; aptitude and intelligence tests; mathematical based problem solving; and general recreational activities.

The shapes are preferably user configurable to allow sides of the shapes to combine/interface, or at least be arranged in registration with each other. In one embodiment of the apparatus there is provided a set of shape pieces having sides which are interfaceable with each other, and which pieces are individually moveable/positionable.

One embodiment of the invention comprises a shape placement region in the form of a template, onto which a user is required to place shapes to fill the shape placement region. Advantageously, we have realised that the shapes can be arranged to form configurations of numerous symmetrical outlines, and so the shape placement region may take the outline of any of those symmetrical outlines.

According to a second aspect of the invention there are provided instructions for a data processor, which, when executed by the data processor, cause a visual display apparatus to display a set of shapes, the shapes derived from a hexagonal footprint, and wherein for each of the shapes, at least some of the vertices of the hexagon, preferably including the centre point, joined with straight lines to define a perimeter of a respective shape of the set.

The instructions may be recorded on a data carrier, may be in the form of a signal, or may be in the form of a software product or other computer readable medium.

According to third aspect of the invention there is provided apparatus comprising a data processor, a visual display device, and the data processor configured to cause the visual display device to display a set of shapes, the shapes derived from a hexagonal footprint, and wherein for each of the shapes, at least some of the vertices of the hexagon, preferably including the centre point, joined with straight lines to define a perimeter of a respective shape of the set.

Preferably the apparatus configured to allow a user to provide an input to allow a user to determine relative displayed positions of at least some of the shapes. The display device preferably displays a graphic user interface.

It will be appreciated that not all shapes need to be displayed simultaneously.

BRIEF DESCRIPTION OF THE DRAWINGS

Various embodiments of the invention will now be described, by way of example only, with reference to the following drawings in which:

FIG. 1 shows a basis for defining a set of polygons from a hexagonal footprint,

FIG. 2 shows a set of shapes,

FIG. 3 shows a subset of the set of shapes of FIG. 2 together with the reflections of the subset of shapes, FIG. 4 shows basis for defining the set of shapes, FIG. 5 is a pictorial explanation of edge lengths of the shape set of the shapes of FIG. 4, FIG. 6 illustrates various ways in which some of the shapes of FIG. 4 may be connected, FIG. 7 illustrates area properties of some of the shapes of FIG. 4, FIG. 8a illustrates various hexagonally shaped surfaces, FIG. 8b illustrates various hexagonally shaped surfaces, FIGS. 9a to 9c illustrate the outline of shape placement regions, FIGS. 10a to 10q illustrate possible shape configurations, FIGS. 11a to 11f illustrate possible shape configurations, FIG. 12 illustrates additional repeated shapes, FIGS. 13a to 13w show possible shape configurations, FIG. 14 shows three possible shape configurations, FIG. 15 shows a shape placement activity, FIG. 16a illustrates a hexagonal footprint as a shape placement region for a set of polygons, FIG. 16b illustrates various orientations of shapes within the shape placement region, FIG. 17 illustrates various additional shapes, FIG. 26 shows various winning hands of playing card based activities, FIGS. 31a to 31d show various embodiments of apparatus comprising a plurality of shapes, FIG. 32 shows shape placement templates for activities relating to FIGS. 10a to 10q, FIG. 33 shows shape placement templates for activities relating to FIGS. 10a to 10n and 10q, FIG. 34a shows a shape placement template, FIG. 34b illustrates a possible shape configuration, and FIGS. 34c and 34d illustrate possible design attributes for the shape configuration.

DETAILED DESCRIPTION

Figure 18:
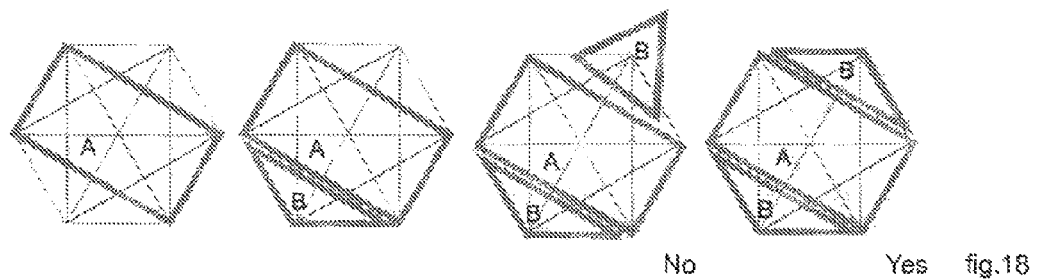
FIGS. 18 and 19 illustrate shapes placed within the shape placement region of FIG. 16a, FIGS. 20a and 20b show two-player apparatus comprising a shape set and a playing board.

Apparatus will now be described which comprises a finite set of polygons that are derived from the footprint of a regular hexagon by joining some or all of the vertices, including the centre point, with straight lines, as shown in FIG. 1.

Eighteen different polygons can be created from this principle; some familiar 'regular' shapes; other shapes are less obvious and mostly 'irregular'. All shapes are contained within the footprint of a regular hexagon. For some applications, the set includes nineteen shapes with the inclusion of the hexagon shape itself, as shown in FIG. 2.

Fourteen out of the eighteen polygons have reflective symmetry of at least order 1. The remaining five shapes do not possess line symmetry, therefore it can be argued that each of those five shapes can be mirrored by reflection to create an additional five shapes. In that regard, reference is made to FIG. 3.

Therefore, the set comprises twenty four 'hexagonally based' polygons when the original hexagon is included.

Each polygon is defined within the area or 'footprint' of a regular hexagon and each straight edge of every resulting polygon is limited to lines that join various combinations of the six vertices and centre point together, as best seen in FIG. 4.

For each polygon only three possible 'edge' lengths occur. A regular hexagon has an area equivalent to the combination of six equilateral triangles placed together. Assuming that the length of each side or 'edge' of the equilateral triangle is one unit, then the perimeter of the hexagon will be six units. Therefore, all edges of each polygon will be either A, one unit length; B, two unit lengths; or C, √3; the line that bisects (cuts in half) two equilateral triangles. (Using Pythagoras, 2 squared−1 squared=the square root of 3≈1.73). In this regard, reference is made to FIG. 5.

Sides A and B are related in length as B is twice the length of A. Shapes that possess sides containing one or more sides of length A and B will connect with each other in the configuration A-A, A-B, B-B. If a shape contains a side of length C it may only connect with another shape containing at least one side of length C, ie C-C, as seen in FIG. 6.

All subsequent activities and applications of the set require the connecting together of some or all of the set of twenty four two-dimensional geometrical polygons in which the properties of each shape, and particularly the 'area', are significant factors. As the (shape-originating) original hexagon is made up of six equilateral triangles, it is assumed that each equilateral triangle has an area of one square unit (1y). If one equilateral triangle is bisected into two, the resulting shape could be connected to form an isosceles triangle, also of area one sq. unit. These triangles represent two out of twenty four of the original polygons of the set and because they both have an area of one sq. unit, and are helpful in calculating and understanding the 'area' properties of all other members of the set. Reference is made to FIG. 7.

Figure 30:
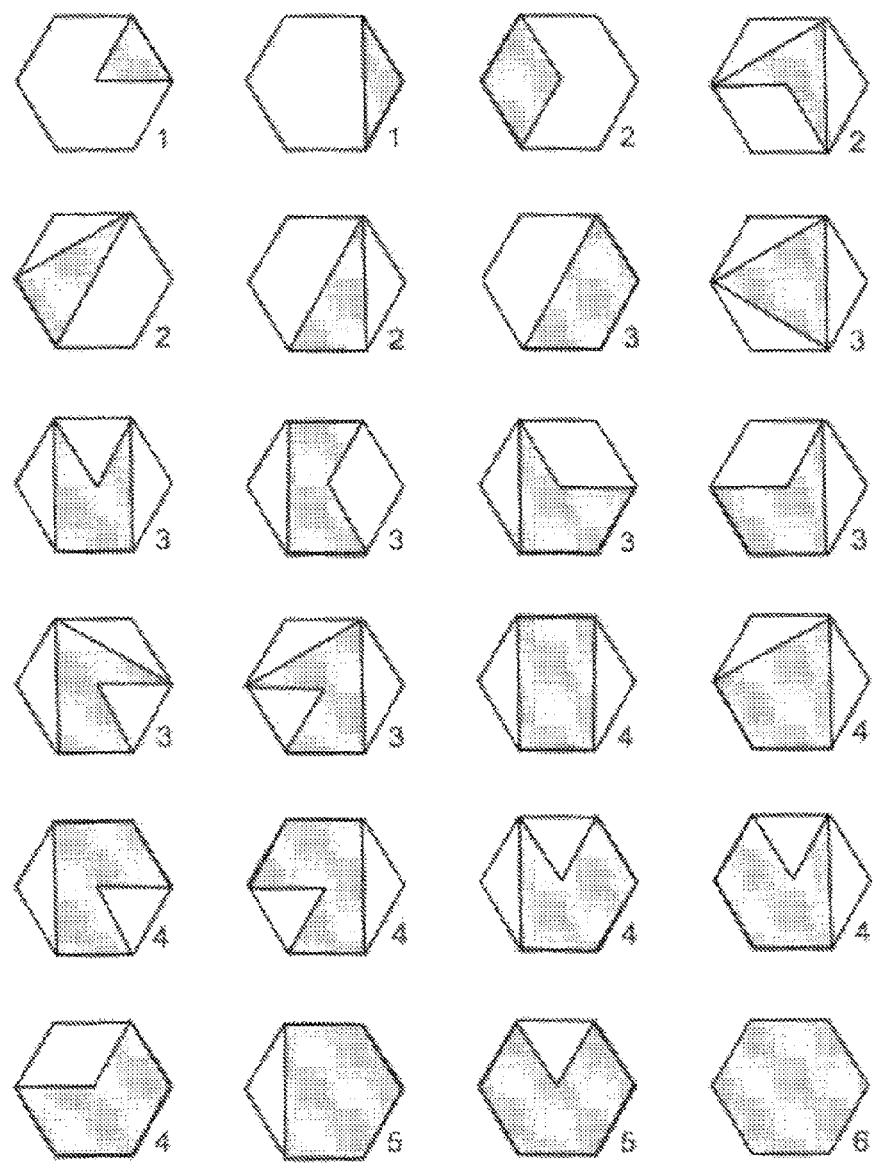
FIG. 30 shows the various areas of each of a set of shapes.

The total area in square units of the twenty four polygons in the set is seventy eight sq. units (78y). A guide to all internal areas of the polygons contained in the set is shown in FIG. 30.

A starting point in developing applications and activities that involve the set is to explore potential designs for a surface (board) on which to place the shapes. To use at least all of the twenty four shapes once without leaving gaps (assuming that they can be configured to combine appropriately), requires a board of area 78 sq. units. To use a hexagonally shaped surface, the area increases as follows 6, 24, 54, 96, 150, etc. Reference is made to FIG. 8a.

The twenty four shapes, with an area of 78 sq. units will be too large for the board of 54 and leave gaps or spaces on a board of 96.

However, within these parameters, it is possible to create two additional hexagons, one of area 18 sq. units and the other, 72 sq. units. Reference is made to FIG. 8b.

To provide flexibility when configuring shapes together on a playing surface or 'board' the design selected in FIG. 9a is preferred. The total unit area available in this shape is 114 sq. units. Other playing surface options are shown in FIG. 9b and FIG. 9c.

The hexagon shape of area 72 sq. units suggests in theory that the set that comprises twenty four shapes with a total area of 78, less the original hexagon shape itself of area 6 sq. units, could be configured to complete the hexagon pattern of area 72 sq. units. The theoretical possibility is realised and the solution outlined in FIG. 10a. This result is highly significant as it demonstrates that a larger hexagon of area 72 has been configured from the 23 unique shapes that derive from the original smaller hexagon (the twenty-fourth shape).

For reference purposes this 'solution' is referenced as Puzzle Solution 1 (PS1). All subsequent solutions and patterns that are deemed significant are similarly labelled.

PS2, shown in FIG. 10b, is a 24 sided polygon that resembles a 'star'. It comprises two hexagrams, one large, one smaller, overlapping each other about a common centre and displaced by 30°.

PS3, shown in FIG. 10c, is a 36 sided polygon that comprises 6 clusters of 3 pointed vertices. All outside edges are the same unit length.

PS4, shown in FIG. 10d, is a 30 sided polygon that resembles a regular hexagon with 6 clusters of 4 units removed from each 'corner'.

PS5, shown in FIG. 10e, is a 24 sided polygon that resembles a regular hexagon with 6 clusters of 3 units removed from each 'side' and a unit 'isosceles' triangle removed from each of 6 'corners'.

PS6, shown in FIG. 10f, is a 24 sided polygon that resembles a regular hexagon with 6 clusters of 4 units removed from each 'side'.

PS7, shown in FIG. 10g, is a 30 sided shape with a hexagonal shape missing from its centre. It resembles a regular hexagon with 6 clusters of 3 units removed from each 'side'. All outer edges are the same length.

PS8, shown in FIG. 10h, is a 30-sided shape with a hexagonal shape missing from its centre. It resembles a regular hexagon with 6 clusters of 2 units removed from each 'side' and a unit 'isosceles' triangle removed from each of 6 'corners'.

PS9, shown in FIG. 10*i*, is an 18 sided shape that resembles a regular hexagon with 6 clusters of 2 units removed from each 'corner' and a 'hole' in the middle in the shape of a hexagram.

PS10, shown in FIG. 10*j*, is a 36 sided shape that resembles a regular hexagon with 6 clusters of 2 units removed from each 'side' and a 'hole' in the middle in the shape of a hexagram.

PS11, shown in FIG. 10*k*, is a 6 sided shape that resembles a regular hexagon with a 'hole' in the middle, also in the shape of a hexagon.

Solutions demonstrated in FIGS. 10*a*-10*q* require all 23 original shapes and omit the original hexagon shape. It is likely that PS1-PS11 (FIGS. 10*a*-10*k*) represent the only solutions in which the 23 shapes of area 72 are configured together to create outcomes that posses both line and rotational symmetry of order 6. All of these solutions resemble modifications to a regular hexagonal form.

In four of the six remaining solutions in this category, PS12-14, FIGS. 10*l*-10*n*, each possess three lines of symmetry and rotational symmetry of order 3 and PS15, FIG. 10*o*, demonstrates two lines of symmetry and rotational symmetry of order 2, and is possibly unique in this attribute.

PS16, FIG. 10*p*, also exhibits three lines of symmetry and rotational symmetry of order 3. However, an outline template for PS14 requires a different shaped surface from that provided for the other solutions in this category. See FIG. 32*p*.

PS17, FIG. 10*q*, represents one example only of a solution that exhibits rotational symmetry of order 6 with no line symmetry. It is possible to create additional shapes that have this property. It is likely that other shapes in this category that possess an area of 72 sq. units using the 23 original shapes that possess three lines of symmetry and/or rotational symmetry of order 3 can be created.

Shape placement templates for PS1-PS17 are shown in FIGS. 32*a* to 32*q* and a different shape placement template for PS1-14, 17, is provided in FIGS. 33*a* to 33*o*. Each template comprises a bounded area in which the shapes can be placed.

Five other solutions that use all 24 shapes (including the original hexagon shape), are described in FIGS. 11*a*-11*e*.

PS18, shown in FIG. 11*a*, is similar to PS7 however in this example, it is a polygon as the centre is solid. All other properties are the same as PS7.

PS18 represents the first, and so far only solution that combines all 24 shapes in a 'polygon' that possesses both reflective and rotational symmetry of order 6. The solution is particularly elegant as the hexagon shape is configured in the center.

PS19, shown in FIG. 11*b*, is similar to PS11 with the exception that the hexagonal 'hole' in the middle is smaller in area and displaced by 30° about the centre point.

PS20, shown in FIG. 11*c*, is similar to PS9 with the exception that the missing 'hole' in the middle is in the shape of a hexagon. All other properties are as PS9. Although not a true 'polygon' (as the middle is missing), PS20 also represents a solution that contains all 24 shapes together in a symmetrical (reflective as well as rotational) configuration of order 6.

PS21, shown in FIG. 11*d*, is a 'polygon' that derives from combining all 24 shapes together in a configuration that contains both reflective and rotational symmetry of order 3.

PS22, shown in FIG. 11*e*, is also a 'polygon' that derives from combining all 24 shapes together in a configuration that contains both reflective and rotational symmetry of order 2 and gives the appearance of thirteen joined hexagons in rows of four, five and four.

PS23, shown in FIG. 11*f*, has a hexagonal shaped hole in the middle and contains both reflective and rotational symmetry of order 2.

The combination of shapes used in creating each of the patterns portrayed in PS1-23 provide one of many possible configurations of fitting together the 23 or 24 shapes to achieve the overall solution. It is not known exactly how many different combinations will result in each pattern.

Configurations demonstrated in PS1-PS23 that use either 23 or 24 shapes of the 'set' and exhibit both line symmetry and/or rotational symmetry are referred to as 'special' solutions. (NB Solutions that have any shape of 'hole' missing from within the shape are not polygons).

A defined number of additional 'duplicate' shapes are introduced in order to increase accessibility, provide greater flexibility of possible solutions, and introduce a wider range of levels of difficulty. All four types of additional shapes are duplicate shapes that derive from the original twenty four shape 'set', as shown in FIG. 12.

The twenty additional shapes provide an additional area of 30 sq. units. The total area of a configuration using all shapes would be 78+30=108. The enlarged set is referred to as the enlarged set.

Applications and activities that require the use of additional shapes and aimed at experimenting and investigating the properties and configurations of the shapes are not restricted to the number of shapes used. However, for all outcomes labelled 'solutions', all twenty four shapes of the set should be used at least once. In addition, each solution should possess rotational symmetry of a least order 2 and/or at least one line of reflective symmetry. A solution will range in area from 78-108.

Examples referred to as PS24-PS46 demonstrate the rich variety of potential composite configurations that are possible to construct using the (basic) set and the enlarged set, as shown in FIGS. 13*a* to 13*w*. It should be noted that there will be other configurations of the shapes that generate the same result for each puzzle and that the solutions shown above are not unique.

Composite 'Solutions' include: an equilateral triangle of 100 sq. units; a hexagon of 96 sq. units; a hexagram (a star of David) of 108 sq. units; an equilateral triangle of 108 sq. units; rectangles of various dimensions, (NB A square is impossible); two joined hexagons; two hexagons each of area 54 sq. units; four hexagons each of area 24 sq. units; multi-hex; an 'irregular' trapezium; a hexagon with protruding regions; a 'setup' configuration of area 108 sq. units; a hexagram of area 102 sq. units; a 'circle'; a rhombus; a trapezium; a polygon with 36 edges; a polygon with 48 edges; a polygon with 42 edges.

The (basic) set and enlarged set provide numerous potential outcomes and possibilities. By experimenting with various configurations of the shapes, different and unexpected results emerge, as exemplified in FIG. 14.

It is intended that guidelines/instructions for using and manipulating the shapes are provided to users along with outline templates of various shape configurations in which the task is to complete the inside of the pattern without leaving gaps while at the same time trying to use the minimum number of shapes. See FIG. 15. Previous examples in FIGS. 10, 11 and 13 can be presented as tasks or puzzles in outline template form (as described above) that provide varying degrees of difficulty.

Single user activities using the physical pieces of the shapes can be summarised as follows:

PA 1—Provide a shape description in words. The user then has to re-create the shape. This format could be used as a basis for a competition eg Create a hexagon that uses all 23 shapes of the basic set but not the original hexagon piece.

PA 2—Provide an outline template with guidelines/instructions. The user then has to fill in the outline with a combination of the shapes, for example as shown in FIG. 15.

PA 3—Provide the enlarged set. The user experiments and plays with various configurations of shapes as an extension to traditional building bricks and mosaics.

Shape placement templates provide activities of varying difficulty and may be catagorised as follows:

1. Templates that require two or more shapes from the (basic) set of shapes to be configured together without leaving any gaps within the template.
2. Templates that require the (basic) set of shapes as well as some or all pieces of the enlarged set.
3. Templates that require the (basic) set of shapes less the (shape-originating) original hexagon piece, encompassing an area of 72y.
4. Templates that require the (basic) set of shapes including the (shape-originating) original hexagon piece, encompassing an area of 78y.

Detailed properties for shape placement templates for category 3 and 4, and pertaining to FIGS. 10 and 11 follow:

The shape placement region of 72y preferably has an outline arranged to accommodate the shapes in at least one of: a 6 sided polygon in the pattern of a regular hexagon encompassing an area of 72y; a 24 sided polygon in the pattern of a 'star' with 12 vertices comprising of two hexagrams, one large, one smaller, overlapping each other about a common centre and displaced by 30° encompassing an area of 72y; a 36 sided polygon that comprises 6 clusters of 3 pointed vertices in which all outside edges are the same unit length encompassing an area of 72y; a 30 sided polygon that resembles a complete hexagon of 96y with 6 clusters of 4y removed from each 'corner' encompassing an area of 72y; a 24 sided polygon that resembles a complete hexagon of 96y with 6 clusters of 3y removed from each 'side' and 6 clusters of 1y removed from each 'corner' encompassing an area of 72y; a 24 sided polygon that resembles a complete hexagon of 96y with six clusters of 4y removed from each 'side' encompassing an area of 72y; a 30 sided shape that resembles a complete hexagon of 96y with 6 clusters of 3y removed from each 'side' and less the further accommodation of 6y at its centre in the shape of a hexagon encompassing an area of 72y; a 30 sided shape that resembles a complete hexagon of 96y with 6 clusters of 2y removed from each 'side' location, 6 clusters of 1y removed from each 'corner' location and less the further accommodation of 6y at its centre in the shape of a hexagon encompassing an area of 72y; an 18 sided shape that resembles a complete hexagon of 96y with 6 clusters of 2y removed from each 'corner' location and less the further accommodation of 12y at its centre in the shape of a hexagram encompassing an area of 72y; a 36 sided shape that resembles a complete hexagon of 96y with 6 clusters of 2y removed from each 'side' location and less the further accommodation of 12y at its centre in the shape of a hexagram encompassing an area of 72y; a 6 sided shape that resembles a regular hexagon of 96y less the accommodation of an area of 24y in the shape of a hexagon at its centre encompassing an area of 72y; a pattern in the shape of twelve joined hexagons in rows of two, three, four and three, encompassing an area of 72y; a pattern of a hexagon encompassing an area of 96y, less the accommodation of an area of 3 clusters of 8y at intervals of 120° encompassing an area of 72y; a pattern of a hexagon encompassing an area of 96y, less the accommodation of an area of 6 clusters of 1y at each 'corner' location, less the accommodation if 18y at its centre in the form of 3 clusters 6y encompassing an area of 72y; a pattern of a rectangle encompassing an area of 72y; a pattern that resembles a triangle less 1y at each of three locations at the mid-points of the sides of the triangle encompassing an area of 72y; and a pattern of a hexagon encompassing an area of 96y, less the accommodation of 6 clusters of 2y from each 'corner' location and a further 6 clusters of 2y from each adjacent 'side' location encompassing an area of 72y.

The shape placement region of 78y preferably has an outline arranged to accommodate the shapes in at least one of: a hexagon of 96y, less the accommodation of an area of 3y at each of six 'side' locations encompassing an area of 78y; a regular hexagon of 96y, less the accommodation of an area of 18y at its centre in the shape of a regular hexagon encompassing an area of 78y; a hexagon of 96y, less the accommodation of an area of 6y at its centre and less the further accommodation of 2y at each of six 'corner' locations encompassing an area of 78y; a pattern that resembles a triangle with the addition of 1y at each of three locations at the mid-points of the sides of the triangle encompassing an area of 78y; a pattern of thirteen joined hexagons in rows of four, five and four encompassing an area of 78y and; a hexagon encompassing an area of 96y, less the accommodation of an area of 6y at its centre and less the further accommodation of 1y at each of six locations and a further 3y at each of two locations encompassing an area of 78y.

The pattern of the shape placement region may possess line and/or rotational symmetry.

A composite shape is preferably capable of being formed using each of the set of shapes and one or more duplicate shapes.

The composite shape preferably possesses rotational symmetry of order of at least two and/or possesses at least one line of reflective symmetry.

The basic set and enlarged set provide the apparatus to generate various applications and activities. Some of these have involved creating patterns within a hexagonal surface of area 24, 54, 72 and 96. Also, the shapes have been used to configure other regular and irregular shapes. The next step is to create activities and applications that are based on the smallest hexagon possible. A hexagon of area 6 sq. units, as shown in FIG. 16.

The 'unit' hexagon contains all the shapes possible that can be generated to create the shape set.

Shapes can be orientated within the hexagonal footprint in 6 'rotated' positions. In the unique case of the unit 'isosceles' triangle, it can be located in 12 positions. See FIG. 16b.

Two methods can be applied to create applications from the hexagonal footprint or shape placement region. The first method involves 'filling' or 'completing' the hexagon. For example, the basic set comprising twenty four unique shapes are placed in container A, and the 20 'additional' shapes in container B (Reference is made to FIG. 17).

By selecting a shape at random from A, the aim is then to complete the hexagon by selecting the appropriate shape(s), also at random, from container B. The example shows both a negative and a positive outcome. Reference is made to FIG. 18.

Figure 19:
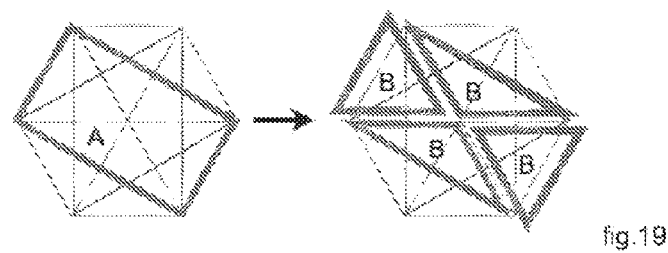

The second method involves re-creating the shapes from the basic set. A shape from container A is chosen at random and participants have to re-create the shape with shapes from Container B. Reference is made to FIG. 19. These themes and applications that result are now explored in more detail.

Figure 20A:
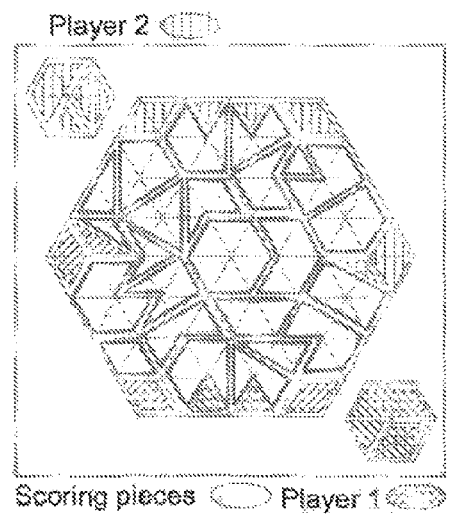
Figure 20B:
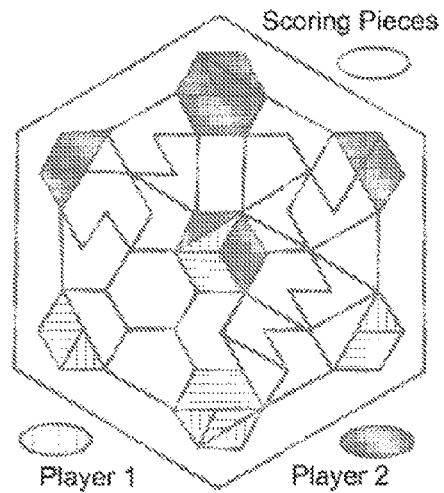

In a two-player application, the objective is to remove all shapes from the playing surface, with the hexagon the last remaining shape. Only the original twenty four shapes are point scoring shapes. Each shape has a points score according to the area of the shape, as shown in FIG. 30. The twenty 'additional' shapes are divided equally between the two players and marked differently so that each player can distinguish between scoring shapes; opponent shapes; and their own shapes. Shapes are placed on the playing surface according to either the diagram in FIG. 20*a* or FIG. 20*b*. Each player chooses a 'scoring' shape that becomes the focus their strategy and does not let other players know the shape they have chosen. Each player takes it in turns to move a shape. Shapes are positioned to be able to contain a scoring shape. A 'scoring' shape can only be removed and its points value obtained when it fits exactly into the small hexagon without leaving a gap. A player's 'additional' shapes are also removed by the same method as the 'scoring' shapes, however, they have no points value, only strategic value. Each time a shape is touched and moved constitutes a 'turn'. A player must remove all their additional shapes from the main playing surface before the final hexagon shape is removed. A player may remove an 'additional' shape from the playing surface at any time, however, this always constitutes a turn.

An extension to the game is for both players, having removed all shapes including the final hexagon, to then replace them one by one in turn. The points for any remaining shapes that won't fit are subtracted from each players score. There are additional points available in specific situations. If a player acquires two shapes and one is the 'reflection' of the other, an additional point is scored. If a player acquires two shapes and together they fit together to form a complete hexagon, an additional point is scored.

Figure 21A:
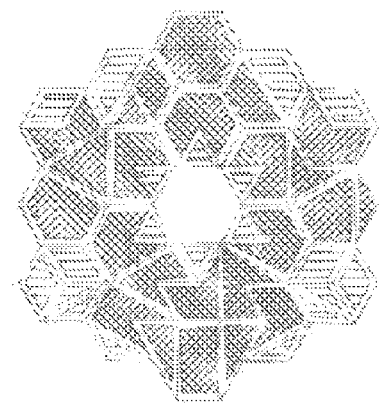
FIGS. 21a and 21b show multiplayer apparatus comprising a shape set and a playing board.
Figure 21B:
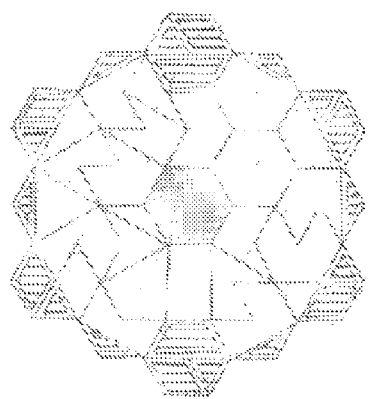

In a multi-player game, the objective is to remove all shapes from the playing area with the hexagon the last remaining shape. The player with the highest score is the winner. Only the original 24 shapes are point scoring shapes. Each shape has a points' score according to the area of the shape (FIG. 30). All shapes are placed on the playing surface according to the diagram in either FIG. 21*a* or FIG. 21*b*.

Figure 22:
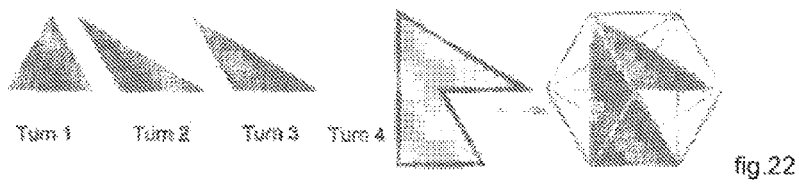
FIG. 22 shows various turns in use of either of the apparatus of FIG. 21a or FIG. 21b.

In turn, each player removes one of the two triangular 'additional' shapes that have an area of 1 sq. unit. A player may use a turn to exchange some or all of their accumulated 'additional' shapes for larger 'additional' shapes if and when required. For example, two equilateral triangles or two isosceles triangles may be exchanged for a rhombus; a rhombus and an equilateral triangle or two isosceles triangles and an equilateral triangle may be exchanged for a trapezium and vice-versa. A player aims to acquire sufficient 'additional' shapes to re-create a 'scoring' shape that they have pre-identified without disclosing it to the other players. If a player intends to attempt to 'score' they should declare a 'play' at the beginning of their turn and should remove the intended shape and place it in the centre of the playing surface. Reference is made to FIG. 22.

In this example, Player A decides to accumulate three 'additional' shapes during three turns. At the beginning of turn 4 the player declares his intention to 'score' by declaring a 'play' and removes the 'scoring' shape they will attempt to re-create and places it in the centre space. Player A then takes the three 'additional' shapes and positions them so that both the 'scoring' shape selected and the re-created shape are identical. If during the 'play' the attempt to re-create the shape fails, the player returns the shape as well as all three additional shapes to the playing surface. If the 'play' is successful and the re-created shape is identical to the 'scoring' shape selected, the player scores points according to the unit area of the shape (in this example, 3 points as the shape has an area of three units), and the shape is removed and kept by the player in order to accurately total the points at the end of the game. In this example, Player A could have decided that their intended 'scoring' shape required more or less "additional' shapes than three and therefore could have declared a 'scoring' move earlier or later. After a 'play' has been declared, whether successful or unsuccessful, all 'additional' shapes used in the 'play' should be returned to play by replacing them on the playing surface.

As with the two-user application, an extension to the game is for all players, having removed all shapes including the final hexagon, to then replace them one by one in turn. The points for any remaining shapes that won't fit are subtracted from each player's score. There are additional points available in specific situations. If a player acquires two shapes and one is the 'reflection' of the other, an additional point is scored. If a player acquires two shapes and together they fit together to form a complete hexagon, an additional point is scored. When a player declares a 'play' it can be challenged by other players if they can re-create the scoring shape with fewer shapes. In this scenario, the challenging player would acquire the 'scoring' shape and allotted points. The player who declared the 'play' unsuccessfully, would forfeit the shapes they used in the 'play' and return them back to the playing surface.

Most, if not all, of the activities using the physical shapes above, which could be made of any suitable material, can be realised as digital applications. Applications ('Apps'), developed digitally allow shapes to be manipulated using 1), handheld devices—small displays such as iPods®, iPhone®, Nintendo DS® etc, 2), computers and 'tablet' devices—medium displays such as iPads® and 3) interactive displays—large displays such as interactive whiteboards and interactive horizontal table devices. The most effective use of digital applications will be using devices that incorporate 'touch' technology. These devices include a data processor, a visual display and instructions for the data processor to generate a suitable display on the visual display.

Electronic Application 1—This application requires generation of a set of 'digital' shapes that consists of the extended set. The user has the ability to move the shapes into various configurations. Two types of activity are offered. 1) Challenges expressed in words such as, "Create a figure in the shape of a hexagon that uses all twenty three shapes of the set but not the original hexagon piece itself." 2) Outline templates that require the user to use the minimum number of shapes necessary to complete the inside of a template without leaving gaps. This can be either timed or un-timed.

Electronic Application 2—This application requires a playing surface of a single hexagon unit. The player starts with a credit score of six points. By selecting Button A, one of the twenty four shapes will appear, at random, within the footprint of the hexagon. The potential score depends on the area of the shape that appears. Should the hexagon shape itself appear, the player automatically scores six points. However, for all other shapes, the player should then select Button B to generate one of the 'additional' shapes which will appear to the side of the playing surface. The 'additional' shapes that appear should then be manipulated into the footprint of the hexagon until eventually no gaps are left. When the unit hexagon has been completed, the player obtains the points of the 'scoring' shape. If the 'additional' shape that appears does not 'fit' into the footprint of the hexagon, either the game is over—with no points, or, the player can choose to continue but forfeits one point to discard the 'additional' shape each time a shape is generated that does not fit.

Electronic Application 3—A digital version of two-user application described above.

Electronic Application 4—A digital version of multi-user application described above.

Figure 23A:
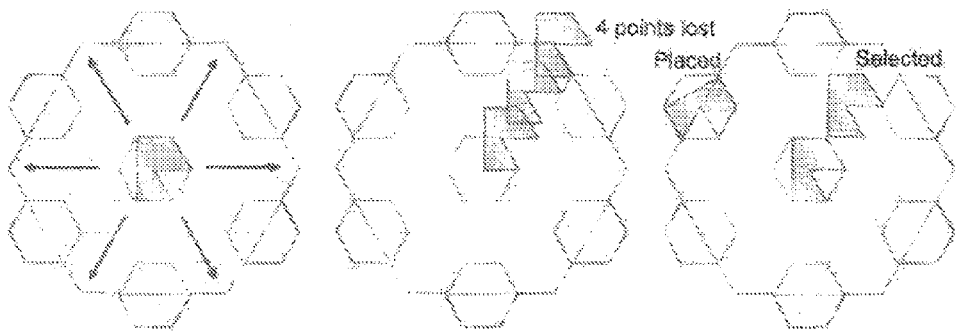
FIGS. 23a and 23b shows a sequence of six images displayed by a visual display device of an electronic application apparatus.
Figure 23B:
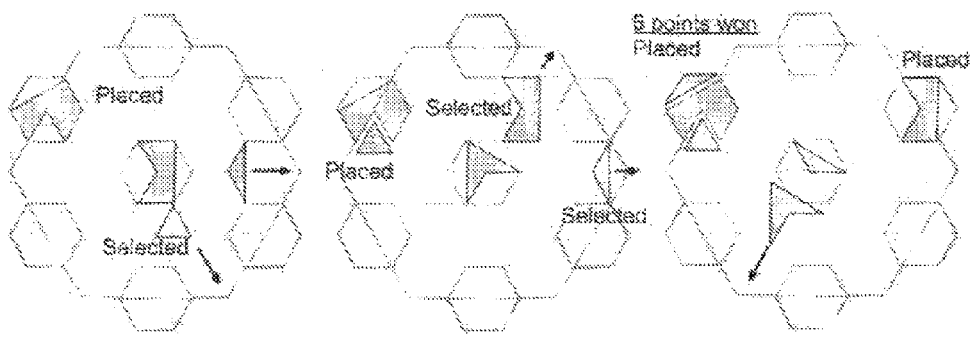

Electronic Application 5—This application requires a player to complete the six hexagon cells located on the outside of the playing surface by filling them with various shapes from the twenty four shapes that comprise the basic set. At random, a shape appears in the centre hexagon. It then begins to travel to the outside of the playing surface following one of 6 six routes, as shown in FIG. 23. A player selects the shape, by tapping onto the visual display screen, and manoeuvres it into position within one of the hexagon cells in one continuous movement. If a shape is 'tapped' and not located into one of the outside cells within a 'reasonable'/predetermined amount of time, it will break free from the 'touch' and continue its movement to the outside of the playing surface. Shapes may be moved in any direction and may also be rotated. When a hexagon is complete, the contents of the hexagon cell clears and six points are scored. If a shape reaches the 'outside' without being tapped or selected, points are lost according to the value of the scoring shape. If an outside 'cell' is left partly filled for too long, it begins to pulsate. Unless the cell is quickly completed, it will explode and the cell removed leaving only 5 cells. If all cells on the outside are lost the game is over. If a players score drops below zero the game is over.

The aim is to gain as many points as possible.

Figure 24:
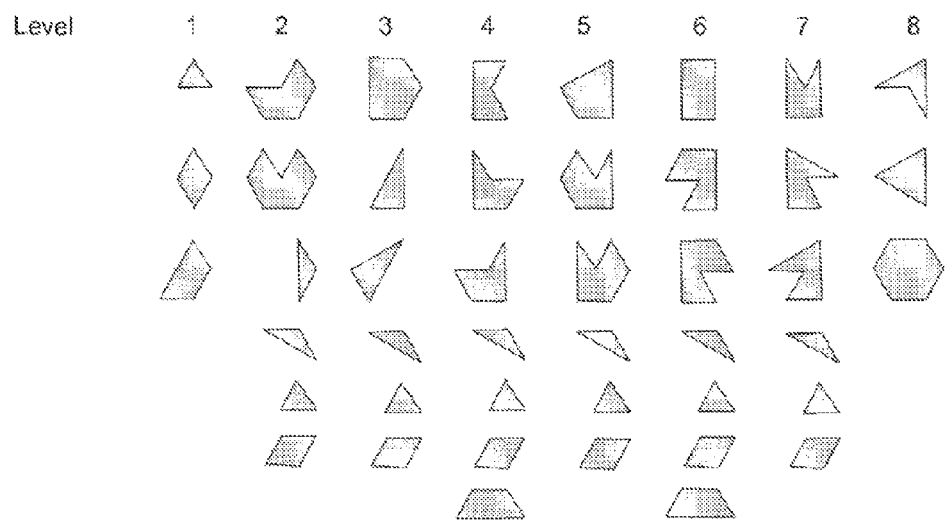
FIG. 24 illustrates shapes corresponding to different levels of difficulty of the electronic application apparatus of FIG. 23.

Shapes from the basic set are introduced to the game at intervals that indicate eight levels of difficulty. Reference is made to FIG. 24. Both 'Scoring' shapes as well as 'additional' shapes appear in groups to ensure there exists a realistic opportunity to be successful. Another method to increase the complexity and difficulty of this application is to increase the rapidity of emerging shapes from the centre and/or increase the speed at which shapes move.

By the time Level 8 is achieved, any of the twenty four 'Scoring' shapes and all of the 20 'Additional' shapes will be in play and may emerge from the hexagon at the centre.

Figure 25:
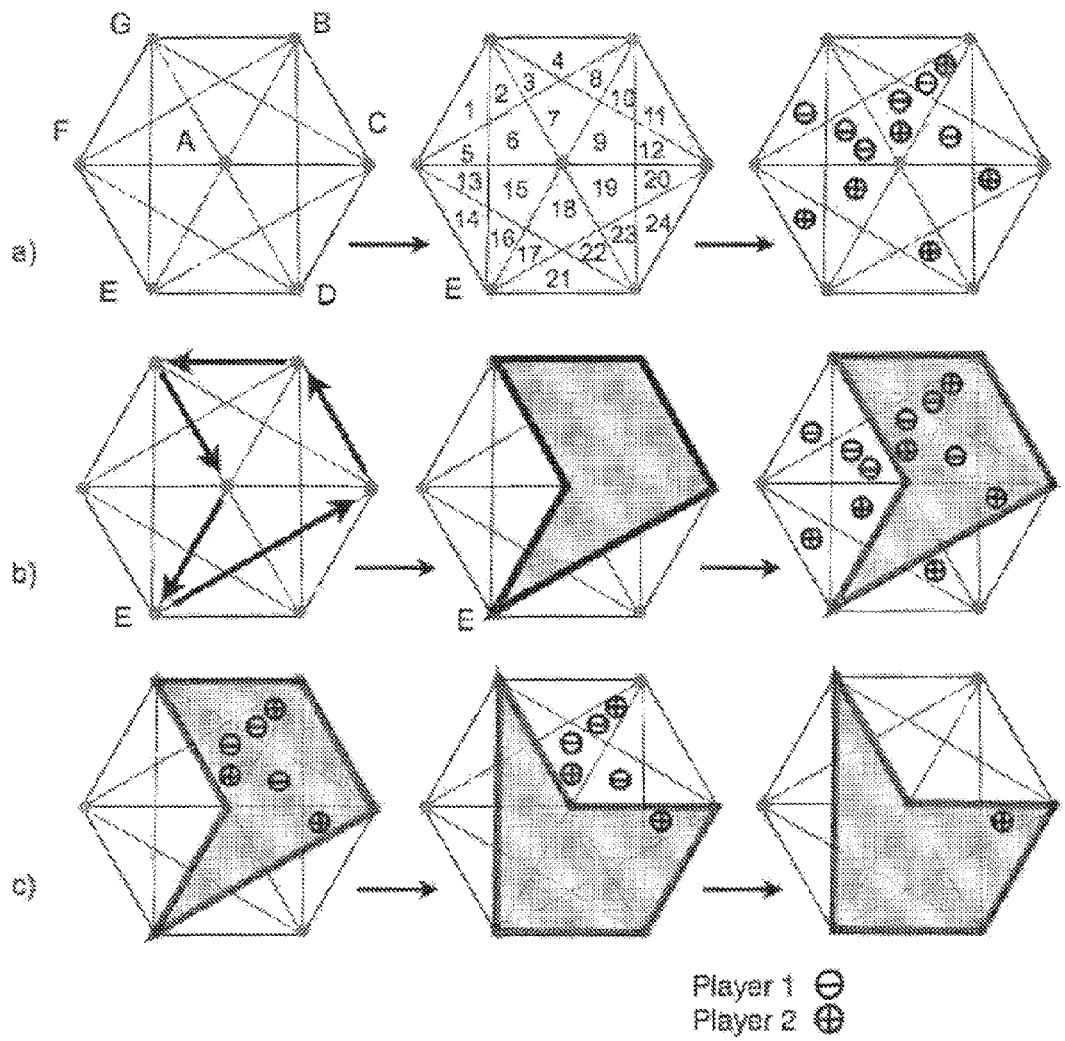
FIG. 25 shows a sequence of images of a game apparatus.

Electronic Application 6—Reference is made to FIG. 25. This application requires a player or players to place 'tokens' within a grid pattern. Tokens are then eliminated by movements within the grid according to rules that govern the emerging set of shapes. The player with the most tokens remaining wins. At the beginning of the 'play', the nodes A-G light up in turn in a random order. The last point to light up becomes the starting point of one round of the game, in this example, E. Within the grid there are twenty four sections for players to place their tokens. In this example, two players each have six tokens each and place them in sectors according to the diagram. Once tokens have been placed on the grid, the game commences. A random path emerges starting from the node labeled E and, following the straight lines of the grid, continues until it reaches another node. On reaching another node, it changes direction again and makes its way to the next. This continues until the path returns to the node located at E. The only rules for the construction of the path are: a) it does not cross an existing line between nodes, b) it does not re-trace the path of an existing line and c) it does not take a route that makes it impossible to return to E without forming a polygon. In this way, the resulting combination of straight lines will outline a polygon that represents one of the twenty four shapes of the shape set. The tokens that lie within the shape remain, those that do not are removed. On random occasions, as the shape emerges it will either start to rotate before finally settling into a final position from which gains and losses can be assessed or the players can decide to remove winning 'tokens' before risking them to further movement of the shape. Winners are players with remaining tokens or a winner is the player with most remaining tokens. In this example Player 2 wins has he has one and only remaining token.

Many of the applications described above can be adapted as playing card activities using four possible variants:

Type A 'Scoring' cards are represented by one pack of twenty four cards that represent the twenty four shapes.

Type B 'Scoring' cards are represented by one pack of twenty four cards that represent the twenty four shapes and a second pack of cards that represent the 'Additional' shapes and consist of twenty cards.

Type C Both 'Scoring' cards as well as 'Additional' cards are represented in one pack of forty four cards.

Type D 'Additional' cards represented by a pack of twenty cards.

When appropriate, more than one pack of each type of pack may be used depending on the requirements of individual games.

Playing Card Application 1—Snap—Type A—All twenty four 'Scoring' cards are dealt to two players face down. Cards are placed down in turn awaiting two similar shapes OR two shapes that together make a hexagon. The first player to state 'Snap' or another pre-agreed word, wins the pile. The winner is the first to gain all cards when the other player runs out of cards. Two packs or more can be used for larger numbers of players.

Playing Card Application 2—Pairs—Type A—All twenty four 'Scoring' cards are placed individually face down in a rectangular grid 6×4. Players take it in turn to try to gain a pair of identical shapes by the turning over of two cards. If unsuccessful the cards are replaced. If successful the cards are removed. The winner is the player to gain most pairs. Two packs or more can be used for larger numbers of players.

Playing Card Application 3—Black Jack or '21'—Type B—The two sets of cards are set down in two separate stacks. Each player receives one card from the 'Scoring' cards pile. The aim is to add cards from the second stack of 'additional' cards to complete the hexagon. The player may twist, stick or go bust in the same way Black Jack or '21' is played with a traditional pack of playing cards. Two packs or more can be used for larger numbers of players.

Playing Card Application 4—Hex-it—Type B—The two sets of cards are set down in two separate stacks. A card is turned face up from the 'Scoring' cards stack. The aim is to gather cards from the second stack of 'additional' cards to complete the hexagon. Players take it in turn to add to their collection of cards up to a total of six cards, keeping their cards hidden from their opponents. When it is time to take a seventh card a player may either refuse to take a card or take a card and replace one existing card back to the bottom of the stack. When a player has the appropriate shapes in their collection of cards to complete the hexagon they should wait to the beginning of their next turn and declare 'play' as opposed to 'pick-up'. If a player is successful and 'plays' the necessary shapes to complete the hexagon, they remove this card and score points according to the unit area of the shape removed. They also turn over the next card to instigate the next round of play. If a player is unsuccessful, the card remains face up and play continues. The unsuccessful attempt results in those accumulated cards used in the play to be forfeited and be returned to the stack. Two packs or more can be used for larger numbers of players.

Playing Card Application 5—'Poker'—Type A—Two sets of cards representing the 'Scoring' cards only are set down. Each player receives three cards which are kept hidden. Three cards from the stack are then displayed. The three cards are added to one at a time until six cards are displayed. A 'round' can last from three to six of the cards being displayed from the stack. Winning hands and the hierarchy of shapes are defined in FIGS. 26 and 27. Two packs or more can be used for larger numbers of players.

It will be appreciated that all descriptive names given above to applications are working titles only and if they are suggestive of regular playing card games it is because they possess similar concepts.

Figure 27:
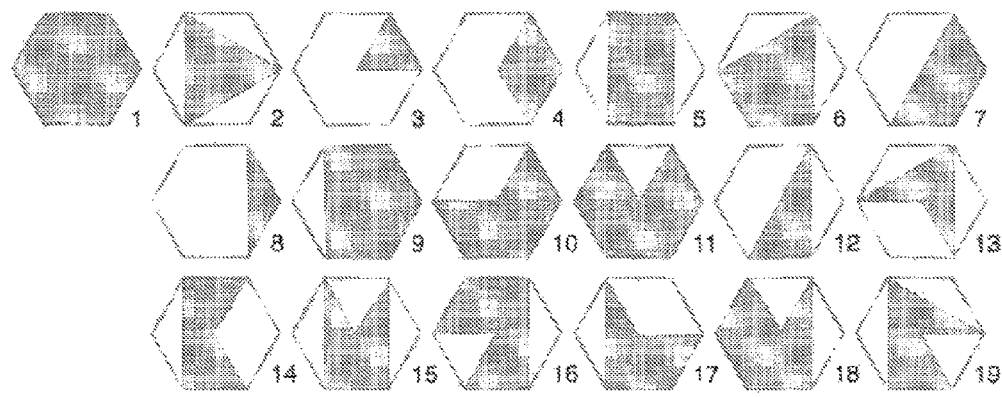
FIG. 27 illustrates a hierarchy of shapes.

The general rules are as follows:
  There are two starting positions for this game. Both a five card version and a six card version are viable. The six card version is described above. The five card version means that each player receives two cards instead of three and two cards are displayed and added to until a maximum of five are displayed. A winning 'Hex Run' in the five card version will omit the 'Hexagon' card.
  Same colour combinations always takes precedence over two colours combinations unless otherwise stated
  When a player receives the 'Hex' card or the 'Hex' card comes into play, then making a complete hexagon will triumph over all other hands except a 'Hex Run'.
  In the case of equivalent hands, card values are calculated according to the Hierarchy of Shapes table, as shown in FIG. 27.

Physical Applications (as opposed to 'digital' Applications) that combine some of the mediums already described (such as shape pieces, playing cards and dice) are proposed and outlined as follows.

Figure 28:
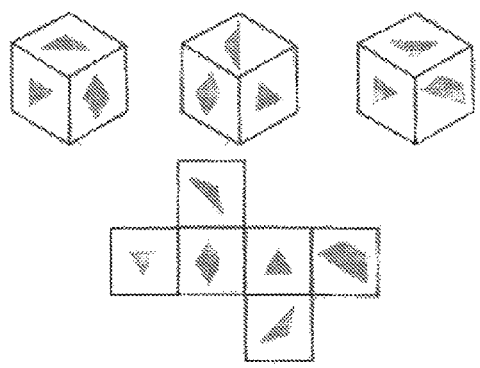
FIG. 28 illustrates three dice.

Combination Application 1—A game that uses the basic set of twenty four 'Scoring' shapes on playing cards while the four 'Additional' shapes are represented on three dice. Reference is made to FIG. 28.

Figure 29:
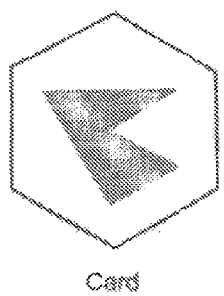
FIG. 29 illustrates a playing card and the shapes required on three throws of the dice of FIG. 28.

In this activity, a pack of cards containing the basic set is placed face down. The top card is turned over. The player then chooses one, two or three dice to attempt to 'complete' the hexagon. See example in FIG. 29.

An extension to this application is to use the dice only to throw the shapes that will combine to make a hexagon.

Combination Application 2—This activity is similar to Combination Application 1 except that a player throws between one to three dice in order to re-create the shape that appears from the pack of cards containing the set. The 'joker' in the pack in this game is the rectangle as it is impossible to re-create it with the shapes on the dice. Therefore, if a player draws the 'rectangle' and the player is still in the game after a throw of three dice, the player is offered an additional throw.

Combination Application 3—This activity requires a playing surface and all shape pieces with two packs of cards (twenty four original scoring shapes and twenty additional shapes).

A card is turned over face up from the top of the twenty four original scoring shapes pack. This card represents the shape that both players will now attempt to re-create by collecting turn by turn, shapes from the second pack of twenty additional shapes. The shape is identified on the board, removed and placed in the centre of the playing surface to represent the focus of the activity to follow. In turn, each player removes an 'additional' card until a player has sufficient 'additional' shape cards to re-create the 'scoring' shape. If a player intends to attempt to 'score' they should declare a 'play' at the beginning of their turn. The player now declares the cards they intend to use to re-create the shape in the centre by selecting the shapes from the playing surface. The 'additional' shapes are now maneuvered into position to create a replica of the shape in the centre of the board. If the attempt is successful, the player keeps the shape in the center and scores the points according to its points value. The cards the player has used to re-create the shape are returned to the bottom of the pack. If the player is unsuccessful in their attempt, the shape is returned to play and the player forfeits the cards back to the pack.

Another embodiment of the invention comprises an 'education' pack which reflects the geometrical nature of the twenty four shapes and the various configurations that are possible to create as outcomes. It consists of individual, pair and group activities. It provides activities and tasks that concentrate on analysis of the geometrical properties of each shape. These include:
  Properties of Polygons
  Special names—Triangles, Quadrilaterals etc
  Special properties—Regular/Irregular; Concave/Convex
  Angles—Acute, Obtuse, Reflex, Right-angled
  Symmetry—Line, Point/Rotational
  Measurement—Perimeter, Area
  Tessellations
  Terminology At a basic level, students are encouraged to 'play' with the shapes and to attempt to create both mathematically satisfying as well as familiar configurations through experimentation.

The education pack provides tasks that link and align to education learning targets according to local and national requirements.

It is possible to enhance the 'look and feel' of the shape set further by examining various methods for adding designs to the two opposite 'surfaces' of each and every shape, both the top and bottom:
(i) Plain
(ii) Symbols—individual symbols on each shape, as shown for example in FIG. 31a.
(iii) Image—individual images on each shape, as shown for example in FIG. 31b.
(iv) Pattern—a pattern that works when two or more shapes are placed together in any configuration, as shown for example in FIG. 31c.
(v) Picture puzzle—an image that only becomes clear when the shapes are placed together in a specific configuration, as shown for example in FIG. 31d.
(vi) Application orientated—markings or colours that are essential to the usage of the shapes in an Application.

The shape configuration in FIGS. 34a, 34b, 34c and 34d represents the most elegant embodiment and combination of shape configuration, shape placement and additional pattern design. The shape placement template for PS47 is shown in FIG. 34a. The template comprises of seven bounded areas or sub-regions in each of which a subset of the shapes may be placed. Conveniently each area may be provided as a recessed region. The shape configuration labelled PS47 and demonstrated in FIG. 34b, requires all twenty three original shapes and omits the original hexagon. Individual designs are added to each shape in FIG. 34c. A single design pattern is added to the overall shape configuration in 34*d*, in which component parts of the pattern are provided on respective shapes.

As each shape has two surfaces, a basic set may exhibit any two of the above. For example a set might have one overall pattern that works however the shapes are configured on one side while the other side exhibits a specific symbol for each individual shape (iv) & (ii). Another example might use a picture that covers one side and only works when the shapes are configured in one unique configuration while the other side might be left blank (v) & (i). Colour may be added to all variations above as required.

The above embodiments represent the realisation of geometrical apparatus that derive from the footprint of a regular unit hexagon. This unique and finite set of shapes configure together to produce various solutions that are both regular and irregular in form. The properties of the shapes and the way in which they combine advantageously give rise to the creation of numerous applications both physical and digital. Many of the applications can be enjoyed using various media as the delivery mechanism. All applications and activities that derive from this invention are 'shape' orientated as opposed to 'word' or 'number' orientated. Comparison of shapes in order to associate 'value or 'hierarchy' is defined either by the internal area of a shape or by an alternate mathematical property.

The invention claimed is:

1. An apparatus comprising a set of shaped pieces arranged in the form of at least one of a puzzle, a pattern making apparatus, a physical game, a digital application, an educational apparatus, an aptitude or an intelligence test, a problem solving apparatus, and a recreational activity apparatus, wherein:
   (a) each of the pieces is formed from a footprint that is in the form of a hexagon such that each of the shapes has a perimeter that is defined by joining at least some of the vertices of the hexagon with straight lines by way of:
      (i) selecting a starting point at a vertex or centre point of the hexagon,
      (ii) joining the starting point, in sequence, to one or more further vertices or the centre point, and
      (iii) returning to the starting point,
      (iv) such that differently-shaped pieces are created by way of joining different vertices and/or the centrepoint of the hexagon;
   (b) the shapes of the pieces meet the following requirements:
      (i) the length of each side of every one of the plurality of the pieces is either x, 2x, or √3x, where x is the side length of the hexagon from whence the shape of the piece is derived,
      (ii) a first plurality of the pieces include at least one side having a length of 2x, and
      (iii) a second plurality of the pieces includes at least one side having a length of √3x;
   (c) the pieces are individually moveable within the puzzle, pattern making apparatus, physical game, digital application, educational apparatus, aptitude or intelligence test, problem solving apparatus, or recreational activity apparatus, respectively; and
   (d) the pieces are user-configurable to allow sides of the pieces to combine/interface with one another, wherein:
      (i) a piece that includes a side having a length of x is interfaceable, along such side, with any other piece that includes a side having a length of x,
      (ii) a piece that includes a side having a length of 2x is interfaceable, along such side, with any other piece that includes a side having a length of 2x, and
      (iii) a piece that includes a side having a length of √3x is interfaceable, along such side, with any other piece that includes a side having a length of √3x.

2. The apparatus of claim 1, wherein for at least some of the shapes the centre point of the hexagonal footprint is joined to two vertices.

3. The apparatus of claim 1, wherein each shape is derived by selecting a starting point at a vertex or centre point of the hexagonal footprint; joining the starting point, in sequence, to one or more further vertices or the centre point; and returning to the starting point, where the sequence defines the shape.

4. The apparatus of claim 1, comprising eighteen shapes; wherein there are nineteen shapes when a hexagon shape is included.

5. The apparatus of claim 4, wherein five of the nineteen shapes are reflectively asymmetric, and wherein five further shapes are defined by reflections of the five reflectively asymmetric shapes, to provide a set of twenty four shapes within the hexagonal footprint.

6. The apparatus of claim 4, further comprising a subset of the set of the nineteen shapes, arranged to allow the selection of the subset of shapes to construct a hexagonal shape within a hexagonal outline of a shape placement region having a substantially hexagonal shape.

7. The apparatus of claim 5, wherein the total area of the twenty four defined shapes is 78y, where y is the area of one of six equilateral triangles configurable to form the hexagonal footprint.

8. The apparatus of claim 1, wherein the footprint and the shapes are defined in two dimensions.

9. The apparatus of claim 1, further comprising a bounded area of particular outline arranged to receive the shapes.

10. The apparatus of claim 9, further comprising a shape placement region arranged to permit deployment of all shapes at the same time.

11. The apparatus of claim 9, wherein the shape placement region has an area of at least 72y, wherein y is the area of one of six equilateral triangles configurable to form the hexagonal footprint.

12. The apparatus of claim 9, wherein the shape placement region is of substantially hexagonal shape.

13. The apparatus of claim 9, wherein there are a plurality of configurations of the shapes which can be accommodated by the shape placement region.

14. The apparatus of claim 11, wherein the shape placement region has an area of at least 78y.

15. The apparatus of claim 12, wherein the shape placement region has a hexagonal footprint having an area of 96y or greater.

16. The apparatus of claim 1 further comprising a number of additional shapes, being duplicate shapes of one or more of the set of shapes.

17. The apparatus of claim 16, wherein a composite shape is capable of being formed using each of the set of shapes and one or more of the duplicate shapes.

18. The apparatus of claim 1 further comprising instructions relating to use of the shapes as at least one of a game, a puzzle, a gaming apparatus and an educational apparatus.

19. The apparatus of claim 1, wherein the apparatus is arranged to allow a user to configure the relative positions of the shapes.

20. The apparatus of claim 1, further comprising a shape placement template for use with the shapes which comprises a bounded area of particular outline arranged to receive the shapes.

21. The apparatus of claim 20, wherein the shape placement template comprises multiple shape placement sub-regions.

22. An apparatus comprising a set of shaped pieces arranged in the form of at least one of a puzzle, a pattern making apparatus, a physical game, a digital application, an educational apparatus, an aptitude or an intelligence test, a problem solving apparatus, and a recreational activity apparatus, wherein:
(a) each of the pieces is formed from a footprint that is in the form of a hexagon such that each of the shapes has a perimeter that is defined by joining at least some of the vertices of the hexagon with straight lines by way of:
(i) selecting a starting point at a vertex or centre point of the hexagon,
(ii) joining the starting point, in sequence, to one or more further vertices or the centre point, and
(iii) returning to the starting point,
(iv) such that differently-shaped pieces are created by way of joining different vertices and/or the centrepoint of the hexagon;
(b) the pieces include:
(i) a first piece of triangular form comprising three sides of length x,
(ii) a second piece of quadrilateral form comprising four sides of length x,
(iii) a third piece of quadrilateral form comprising one side of lengths 2x, and three sides of length x,
(iv) a fourth piece of triangular form comprising two sides of length x, and one side of length $\sqrt{3}x$,
(v) a fifth piece of quadrilateral form comprising two sides of length $\sqrt{3}x$, and two sides of length x,
(vi) a sixth piece of triangular form comprising three sides of length $\sqrt{3}x$,
(vii) a seventh piece of quadrilateral form comprising two sides of length x and two sides of length $\sqrt{3}x$,
(viii) an eighth piece of quadrilateral form comprising two sides of length $\sqrt{3}x$, and two sides of length x,
(ix) a ninth piece of triangular form comprising a side of length x, a side of length $\sqrt{3}x$ and a side of length 2x, and
(x) a tenth piece of triangular form comprising a side of length x, a side of length $\sqrt{3}x$ and a side of length 2x;
(c) the pieces are individually moveable within the puzzle, pattern making apparatus, physical game, digital application, educational apparatus, aptitude or intelligence test, problem solving apparatus, or recreational activity apparatus, respectively; and
(d) the pieces are user-configurable to allow sides of the pieces to combine/interface with one another, wherein:
(i) a piece that includes a side having a length of x is interfaceable, along such side, with any other piece that includes a side having a length of x,
(ii) a piece that includes a side having a length of 2x is interfaceable, along such side, with any other piece that includes a side having a length of 2x, and
(iii) a piece that includes a side having a length of $\sqrt{3}x$ is interfaceable, along such side, with any other piece that includes a side having a length of $\sqrt{3}x$.

* * * * *